United States Patent
Abe

(10) Patent No.: US 9,979,840 B2
(45) Date of Patent: May 22, 2018

(54) IMAGE PROCESSING SYSTEM, INFORMATION PROCESSING APPARATUS, AND METHOD OF CONTROLLING THE SAME

(71) Applicant: CANON KABUSHIKI KAISHA, Tokyo (JP)

(72) Inventor: Koichi Abe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/366,103

(22) Filed: Dec. 1, 2016

(65) Prior Publication Data
US 2017/0187892 A1    Jun. 29, 2017

(30) Foreign Application Priority Data
Dec. 25, 2015    (JP) ................................. 2015-255244

(51) Int. Cl.
*H04N 1/00*    (2006.01)
*G06F 3/12*    (2006.01)

(52) U.S. Cl.
CPC ......... *H04N 1/00196* (2013.01); *G06F 3/125* (2013.01); *G06F 3/1208* (2013.01); *G06F 3/1243* (2013.01); *G06F 3/1286* (2013.01)

(58) Field of Classification Search
CPC .................................................. H04N 1/00196
See application file for complete search history.

(56) References Cited

U.S. PATENT DOCUMENTS

| | | | |
|---|---|---|---|
| 6,853,461 B1 | 2/2005 | Shiimori | |
| 2005/0120047 A1 | 6/2005 | Shiimori | |
| 2005/0237578 A1* | 10/2005 | Ikeda | G06Q 10/087 358/302 |
| 2007/0076258 A1* | 4/2007 | Yoda | H04N 1/3871 358/1.18 |
| 2014/0241697 A1* | 8/2014 | Yoneda | G11B 27/105 386/248 |
| 2016/0260460 A1 | 9/2016 | Abe | |

FOREIGN PATENT DOCUMENTS

JP    3762833 B2    4/2006

* cited by examiner

*Primary Examiner* — Ibrahim Siddo
(74) *Attorney, Agent, or Firm* — Fitzpatrick, Cella, Harper & Scinto

(57) ABSTRACT

An image processing system includes first and second information processing apparatus that include a plurality of templates and identification information assigned to each template. The information processing apparatus include at least one processor and memory storing code that, when executed, causes the information processing apparatus to generate a plurality of layout images by laying out an image in a slot of each template using the templates, to generate layout information in which the pieces of identification information respectively assigned to the plurality of templates are described in an arrangement order of the templates in the plurality of layout images, to generate a data set in which layout data to be laid out in at least one slot included in each of the plurality of templates arranged in the arrangement order are stored using file names with consecutive numbers, and to send the layout information generated and the generated data set.

19 Claims, 23 Drawing Sheets

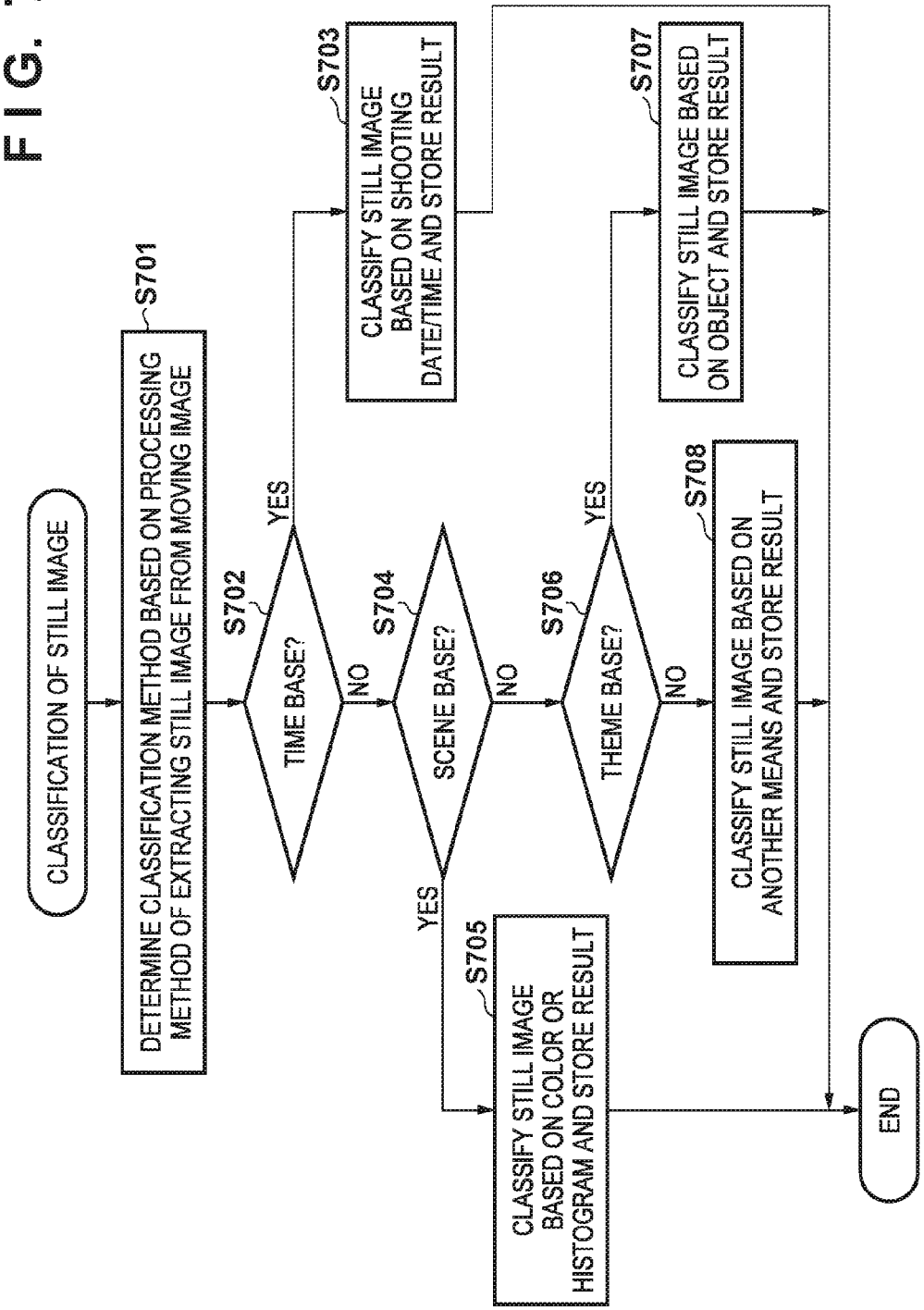

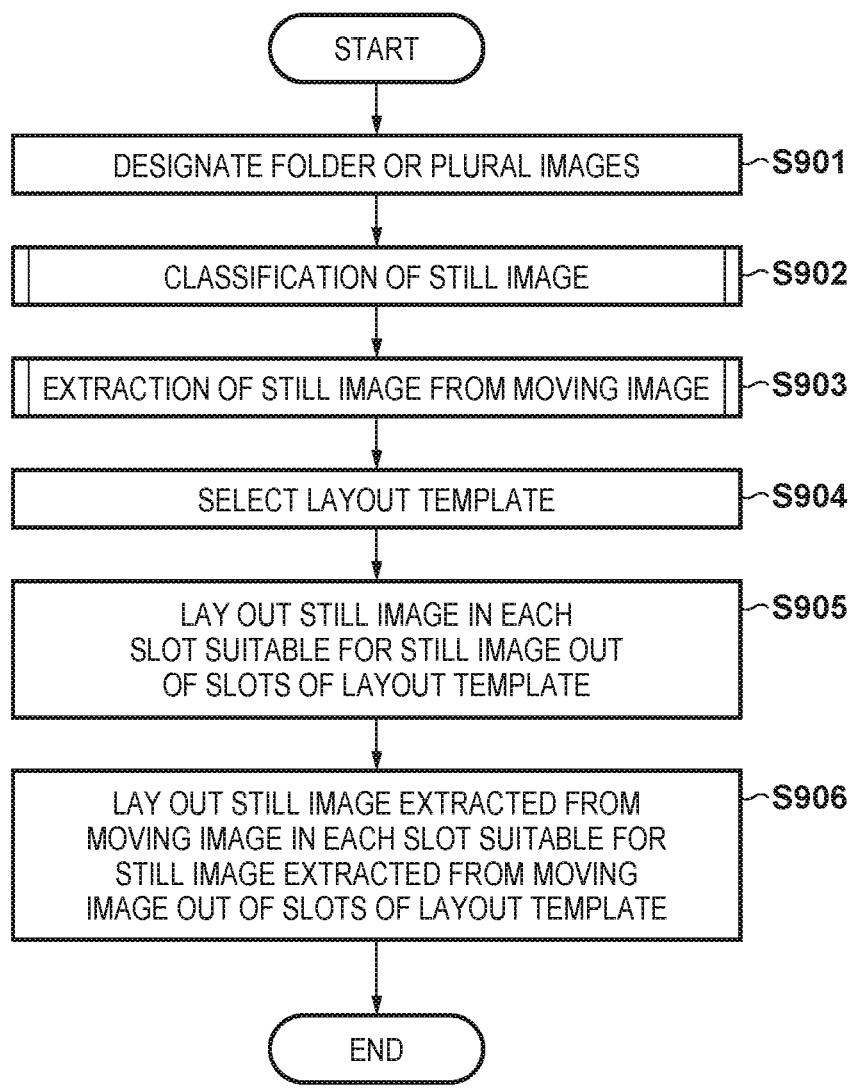

FIG. 10A

| Type-K Page : Front | Type-K Page : 1 | Type-K Page : 2 | ... | Type-K Page : 19 | Type-K Page : 20 | Type-K Page : Back |
|---|---|---|---|---|---|---|
| 1001 | 1002 | | | 1003 | | 1004 |

FIG. 10B

| Type-M Page : Front | Type-M Page : 1 | Type-M Page : 2 | ... | Type-M Page : 49 | Type-M Page : 50 | Type-M Page : Back |
|---|---|---|---|---|---|---|
| 1011 | 1012 | | | 1013 | | 1014 |

FIG. 10C

| Type-N Page : Front | Type-N Page : 1 | Type-N Page : 2 | ... | Type-N Page : 3 | Type-N Page : 4 | Type-N Page : Back |
|---|---|---|---|---|---|---|
| 1021 | 1022 | | | 1023 | | 1024 |

FIG. 13A

| Album Type | Group | Page | Slot | File |
|---|---|---|---|---|
| K | G2 | 2 | 1 | static1.jpg |
| K | G2 | 2 | 2 | static2.jpg |
| K | G2 | 2 | 3 | static3.jpg |
| K | G2 | 2 | 4 | dynamic20.jpg |

FIG. 13B

| Album Type | Group | Page | Slot | File |
|---|---|---|---|---|
| K | G2 | 2 | 1 | static1.jpg |
| K | G2 | 2 | 2 | static2.jpg |
| K | G2 | 2 | 3 | static3.jpg |
| K | G2 | 2 | 4 | dynamic24.jpg |

FIG. 13C

| Album Type | Group | Page | Slot | File |
|---|---|---|---|---|
| K | G5 | 5 | 1 | static14.jpg |
| K | G5 | 5 | 2 | static28.jpg |
| K | G5 | 5 | 3 | dynamic44.jpg |
| K | G5 | 5 | 4 | dynamic45.jpg |
| K | G5 | 5 | 5 | dynamic46.jpg |

FIG. 13D

| Album Type | Group | Page | Slot | File |
|---|---|---|---|---|
| K | G5 | 5 | 1 | static14.jpg |
| K | G5 | 5 | 2 | static28.jpg |
| K | G5 | 5 | 3 | dynamic44.jpg |
| K | G5 | 5 | 4 | dynamic55.jpg |
| K | G5 | 5 | 5 | dynamic88.jpg |

FIG. 13E

| Album Type | Group | Page | Slot | Attribute | File |
|---|---|---|---|---|---|
| K | G8 | 15,16 | 1 | Static | static11.jpg |
| K | G8 | 16 | 2 | Static | static12.jpg |
| K | G8 | 15 | 3 | Dynamic | dynamic22.jpg |
| K | G8 | 15 | 4 | Dynamic | dynamic43.jpg |
| K | G8 | 15,16 | 5 | Dynamic | dynamic50.jpg |
| K | G8 | 16 | 6 | Dynamic | dynamic78.jpg |
| K | G8 | 16 | 7 | Dynamic | dynamic85.jpg |

F I G. 14

| File | Elements | | | | | Score | |
|---|---|---|---|---|---|---|---|
| | Color | Contrast | Brightness | Focus | Composition | Original | Modified |
| static1.jpg | 9 | 8 | 9 | 10 | 9 | 9.0 | - |
| static2.jpg | 7 | 8 | 8 | 9 | 8 | 8.0 | - |
| static3.jpg | 7 | 7 | 7 | 7 | 7 | 7.0 | - |
| static4.jpg | 5 | 6 | 5 | 4 | 5 | 5.0 | - |
| static5.jpg | 5 | 5 | 5 | 5 | 5 | 5.0 | - |
| static6.jpg | 5 | 3 | 4 | 4 | 4 | 4.0 | - |
| static7.jpg | 4 | 4 | 4 | 4 | 4 | 4.0 | - |
| static8.jpg | 3 | 3 | 3 | 3 | 3 | 3.0 | - |
| static9.jpg | 2 | 3 | 2 | 1 | 2 | 2.0 | - |
| static10.jpg | 1 | 1 | 1 | 1 | 1 | 1.0 | - |
| dynamic20.jpg | 5 | 5 | 5 | 5 | 5 | 5.0 | 6.0 |
| dynamic10.jpg | 5 | 5 | 3 | 3 | 4 | 4.0 | 4.8 |
| dynamic30.jpg | 3 | 5 | 3 | 5 | 4 | 4.0 | 4.8 |
| dynamic40.jpg | 3 | 2 | 4 | 3 | 3 | 3.0 | 3.6 |
| dynamic50.jpg | 3 | 3 | 3 | 3 | 3 | 3.0 | 3.6 |
| dynamic60.jpg | 2 | 2 | 2 | 2 | 2 | 2.0 | 2.4 |
| dynamic70.jpg | 1 | 3 | 1 | 2 | 3 | 2.0 | 2.4 |
| dynamic80.jpg | 1 | 1 | 1 | 1 | 1 | 1.0 | 1.2 |

FIG. 15

| Slot | Reference Point [cm] | Length [cm] | Height [cm] | Rotation [degrees] | Auto Photo Correction | Red Eye Correction | Trimming (x, y) w×h | Angle [degrees] |
|---|---|---|---|---|---|---|---|---|
| K-B-G8-1-S | (1,1) | 16 | 6 | 0 | true | false | (0,0) 1920×1200 | 0 |
| K-B-G8-2-S | (18,1) | 11 | 4 | 0 | true | false | (10,120) 1600×900 | 0 |
| K-B-G8-3-D | (1,8) | 5 | 2 | 0 | false | false | (150,88) 1280×800 | 0 |
| K-B-G8-4-D | (6.5,8) | 5 | 2 | 0 | true | true | (104,0) 640×400 | 90 |
| K-B-G8-5-D | (12,8) | 5 | 2 | 0 | true | true | (0,0) 1920×1200 | 0 |
| K-B-G8-6-D | (17.5,8) | 5 | 2 | 0 | true | true | (44,77) 640×400 | 270 |
| K-B-G8-7-D | (23.0,8) | 5 | 2 | 0 | false | false | (64,128) 1280×800 | 45 |

1501 spans the first five columns (Slot through Rotation); 1502 spans the last three columns (Auto Photo Correction through Angle).

F I G. 17A

| JPEG | MPEG | Date & Time | Info | Group | Frame | Related File |
|---|---|---|---|---|---|---|
| dynamic15.jpg | video1.mp4 | 20140330100010334 | - | - | 1 | - |
| dynamic16.jpg | video1.mp4 | 20140330100011334 | - | - | 31 | - |
| dynamic17.jpg | video1.mp4 | 20140330100012334 | - | - | 61 | - |
| dynamic18.jpg | video1.mp4 | 20140330100013334 | - | - | 91 | - |
| dynamic19.jpg | video1.mp4 | 20140330100014334 | - | - | 121 | - |
| dynamic20.jpg | video1.mp4 | 20140330100015334 | - | - | 151 | - |
| dynamic21.jpg | video1.mp4 | 20140330100016334 | - | - | 181 | - |
| dynamic22.jpg | video1.mp4 | 20140330100017334 | - | - | 211 | - |
| dynamic23.jpg | video1.mp4 | 20140330100018334 | - | - | 241 | - |
| dynamic24.jpg | video1.mp4 | 20140330100019334 | - | - | 271 | - |
| dynamic25.jpg | video1.mp4 | 20140330100020334 | - | - | 301 | - |

F I G. 17B

| JPEG | MPEG | Date & Time | Info | Group | Frame | Related File |
|---|---|---|---|---|---|---|
| static100.jpg | - | 20131224200508444 | 2013122420 | dateTime1 | - | video300.mp4 |
| static102.jpg | - | 20131224200804123 | 2013122420 | dateTime1 | - | video300.mp4 |
| static103.jpg | - | 20131224201458345 | 2013122420 | dateTime1 | - | video300.mp4 |
| static106.jpg | - | 20131228093015234 | 2013122809 | dateTime2 | - | - |
| static109.jpg | - | 20131228094548075 | 2013122809 | dateTime2 | - | - |
| static120.jpg | - | 20140101120300022 | histogram4-1 | histogram4 | - | video320.mp4 |
| static121.jpg | - | 20140101121255330 | histogram4-2 | histogram4 | - | video320.mp4 |
| static123.jpg | - | 20140102141044001 | histogram5-1 | histogram5 | - | - |
| static125.jpg | - | 20140102151225012 | histogram5-2 | histogram5 | - | - |
| static155.jpg | - | 20140814063322345 | object8-1 | object8 | - | video340.mp4 |
| static156.jpg | - | 20140814070707888 | object8-2 | object8 | - | video340.mp4 |
| static157.jpg | - | 20141218113505876 | object9-1 | object9 | - | - |
| static160.jpg | - | 20141220122538443 | object9-2 | object9 | - | - |
| dynamic301.jpg | video300.mp4 | 20131224200805432 | 2013122420 | dateTime1 | 24 | static102.jpg |
| dynamic302.jpg | video300.mp4 | 20131224200806003 | 2013122420 | dateTime1 | 70 | static102.jpg |
| dynamic321.jpg | video320.mp4 | 20140102140435998 | histogram4-2 | histogram4 | 730 | static120.jpg |
| dynamic322.jpg | video320.mp4 | 20140102140544556 | histogram4-3 | histogram4 | 2814 | static120.jpg |
| dynamic323.jpg | video320.mp4 | 20140102140824788 | histogram4-4 | histogram4 | 3115 | static120.jpg |
| dynamic341.jpg | video340.mp4 | 20140707101030111 | object8-3 | object8 | 1218 | static155.jpg |
| dynamic342.jpg | video340.mp4 | 20140707101228058 | object8-4 | object8 | 2958 | static155.jpg |

FIG. 20

| Album Type | Group | Page | Slot | File | Date |
|---|---|---|---|---|---|
| N | G0 | F | 1 | static1.jpg | 0000.dat |
| N | G0 | F | 2 | - | 0001.dat |
| N | G1 | 1 | 1 | static2.jpg | 0002.dat |
| N | G1 | 1 | 2 | static5.jpg | 0003.dat |
| N | G1 | 1 | 3 | static14.jpg | 0004.dat |
| N | G1 | 1 | 4 | static28.jpg | 0005.dat |
| N | G2 | 2 | 1 | dynamic20.jpg | 0006.dat |
| N | G2 | 2 | 2 | static3.jpg | 0007.dat |
| N | G2 | 2 | 3 | static44.jpg | 0008.dat |
| N | G2 | 2 | 4 | static45.jpg | 0009.dat |
| N | G3 | 3,4 | 1 | dynamic88.jpg | 0010.dat |
| N | G3 | 3,4 | 2 | static77.jpg | 0011.dat |
| N | G3 | 3,4 | 3 | - | 0012.dat |
| N | G9999 | B | 1 | static3.jpg | 0013.dat |
| N | G9999 | B | 2 | - | 0014.dat |

```
{
    "product": {
        "type": "Type-N", "binding": "Flat", "cover": "Hard", "media": "Glossy"
    },
    "resolution": 600,
    "pages": [
        {
            "name": "Front Cover",
            "templateId": [N-A-G0]
        },
        {
            "name": "Body",
            "templateId": [N-A-G1, N-A-G2, N-A-G3]
        },
        {
            "name": "Back Cover",
            "templateId": [N-A-G9999]
        }
    ]
}
```

IMAGE PROCESSING SYSTEM, INFORMATION PROCESSING APPARATUS, AND METHOD OF CONTROLLING THE SAME

CLAIM OF PRIORITY

This application claims the benefit of Japanese Patent Application No. 2015-255244, filed Dec. 25, 2015, which is hereby incorporated by reference herein in its entirety.

BACKGROUND OF THE INVENTION

Field of the Invention

The present invention relates to an image processing system, an information processing apparatus, and a method of controlling the same.

Description of the Related Art

Recently, there exists a product that automatically lays out a plurality of still images on a template for a photo album and automatically generates a photo album using a photo album creator application. Also proposed is an edited image print system in which a client computer sends images formed by compositing edited images of a plurality of frames on template images and the layout position data of the images to an image server, and the image server receives them and generates edited images (Japanese Patent No. 3762833).

In Japanese Patent No. 3762833, since the plurality of images to be composited and an editing information file that stores the layout position data corresponding to the plurality of images are associated, the amount of data to be sent becomes very large. In addition, control for image composition becomes complex.

SUMMARY OF THE INVENTION

The present invention makes it possible to decrease the amount of data to be sent from an application.

According to one aspect, the present invention provides an image processing system including a first information processing apparatus and a second information processing apparatus, wherein each of the first information processing apparatus and the second information processing apparatus includes a plurality of templates and identification information assigned to each template, and the first information processing apparatus comprises a first generation unit configured to generate a plurality of layout images by laying out an image in a slot of each template using the plurality of templates, a second generation unit configured to generate layout information in which the pieces of identification information assigned to the plurality of templates used in the layout images generated by the first generation unit are described in an arrangement order of the templates in the plurality of layout images, a third generation unit configured to generate a data set in which layout data to be laid out in at least one slot included in each of the plurality of templates arranged in the arrangement order are stored using file names with consecutive numbers, and a sending unit configured to send the layout information generated by the second generation unit and the data set generated by the third generation unit.

According to another aspect, the present invention provides an information processing apparatus capable of communicating with an external apparatus, wherein each of the information processing apparatus and the external apparatus includes a plurality of templates and identification information assigned to each template, and the information processing apparatus comprises a first generation unit configured to generate a plurality of layout images by laying out an image in a slot of each template using the plurality of templates, a second generation unit configured to generate layout information in which the pieces of identification information assigned to the plurality of templates used in the layout images generated by the first generation unit are described in an arrangement order of the templates in the plurality of layout images, a third generation unit configured to generate a data set in which layout data to be laid out in at least one slot included in each of the plurality of templates arranged in the arrangement order are stored using file names with consecutive numbers, and a sending unit configured to send the layout information generated by the second generation unit and the data set generated by the third generation unit.

According to another aspect, the present invention provides a method of controlling an information processing apparatus capable of communicating with an external apparatus, wherein each of the information processing apparatus and the external apparatus includes a plurality of templates and identification information assigned to each template, and the method comprises generating a plurality of layout images by laying out an image in a slot of each template using the plurality of templates, generating layout information in which the pieces of identification information assigned to the plurality of templates used in the layout images generated in generating the plurality of layout images are described in an arrangement order of the templates in the plurality of layout images, generating a data set in which layout data to be laid out in at least one slot included in each of the plurality of templates arranged in the arrangement order are stored using file names with consecutive numbers, and sending the layout information generated in generating the layout information and the data set generated in generating the data set.

According to the present invention, it is possible to decrease the data amount in communication.

Further features of the present invention will become apparent from the following description of exemplary embodiments (with reference to the attached drawings).

BRIEF DESCRIPTION OF THE DRAWINGS

FIG. 7 is a flowchart showing still image classification processing;

FIG. 9 is a flowchart showing automatic photo album creation processing;

FIGS. 10A, 10B, and 10C are views showing examples of the arrangements of photo albums;

FIGS. 13A, 13B, 13C, 13D, and 13E are views showing the layout relationship between slots and still images;

FIG. 14 is a view showing the scores of still images;

FIG. 15 is a view showing information about the positions of slots and images to be laid out;

FIGS. 17A and 17B are views showing association between still images and a moving image, and classification of still images;

FIG. 20 is a view showing the layout relationship between slots and still images;

DESCRIPTION OF THE EMBODIMENTS

Figure 1:
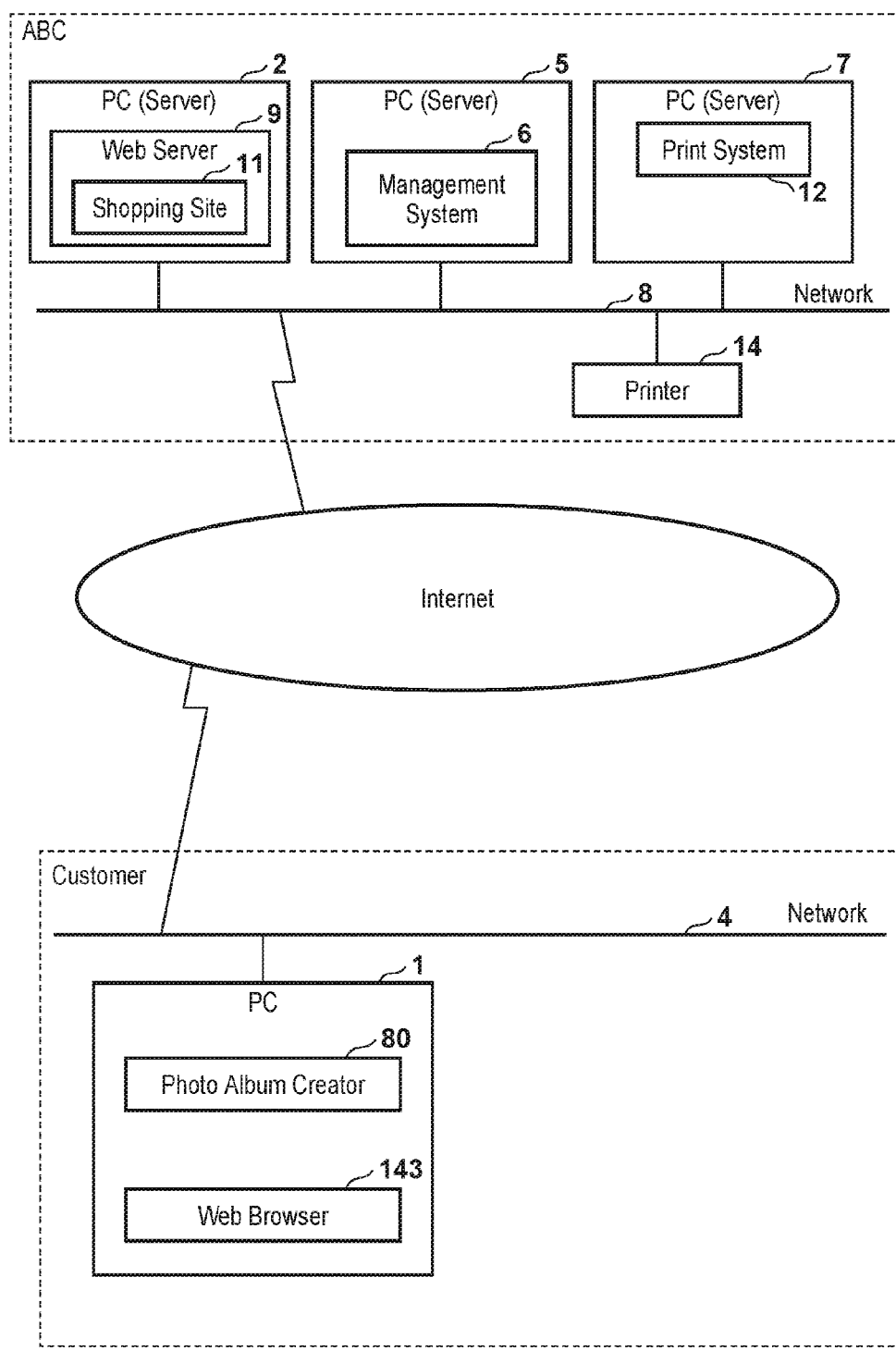
FIG. 1 is a block diagram showing an example of an arrangement of a system including an information processing apparatus.

Embodiments of the present invention will now be described in detail with reference to the accompanying drawings. It should be noted that the following embodiments are not intended to limit the scope of the appended claims, and that not all of the combinations of features described in the embodiments are necessarily essential to the solving means of the present invention. In addition, the same reference numerals denote the same constituent elements, and a duplicate description thereof will be omitted.

First Embodiment

FIG. 1 is a block diagram showing, as an example of an image processing system, an example of the arrangement of a photo album creation/ordering system including an information processing apparatus. Referring to FIG. 1, information processing apparatuses 1, 2, 5, and 7 are each formed from a general personal computer or server (sometimes abbreviated as a PC hereafter). Each of the PCs 1, 2, 5, and 7 is formed from hardware to be described later with reference to FIG. 2. Note that the PCs 2, 5, and 7 are external apparatuses of the PC 1. In this embodiment, an OS equivalent to Windows® 8 or Windows® Server 2012 is installed in each PC as an operating system (sometimes abbreviated as an OS hereafter). The PCs 1, 2, 5, and 7 are connected to networks 4 and 8 each formed from Ethernet®.

A photo album creator application 80 (sometimes abbreviated as an application hereafter) is formed from, for example, a file (*.exe) in an executable format for Windows®. A web browser application 143 (sometimes abbreviated as a web browser hereafter) is a browser used when using the WWW (World Wide Web). The network 4 is a home network for a general home, which is constructed in a house where the user (customer) who uses the PC 1 lives. The network 8 is an office network constructed in the base of the ABC company.

The PC 2 connected to the network 8 includes a web server 9 having the function of a web server, and provides the web site of the ABC company via the Internet. A shopping site 11 is a shopping site on which the ABC company provides a service to users. The user can order a photo album using the shopping site 11. That is, the ABC company constructs a shopping system on the PC 2, and provides a shopping service to the user.

A printer 14 receives print data sent from a print system 12 and prints a photo album ordered by the user. The print data includes, for example, a print ticket on which print settings, and the like, are described, and a PDF (Portable Document Format) file that is print image data. The PC 5 connected to the network 8 includes a management system 6. The management system 6 sends/receives data to/from the PCs 1, 2, and 7 via the Internet. The PC 7 connected to the network 8 includes the print system 12 and sends/receives data to/from the PC 5.

Upon receiving an order of a photo album from the user, the shopping site 11 sends order-associated information (for example, a name, an address, a telephone number, and a delivery destination) about the order to the management system 6. The shopping site 11 also receives the status information and the delivery slip number (tracking number) of the order information sent from the management system 6, and sends a delivery notification based on the pieces of information to the user by mail.

The management system 6 receives the data of the photo album sent from the application 80, temporarily saves the data, associates the data of the photo album with the user's order-associated information sent from the shopping site 11, and manages them as order information. The management system 6 sends the order information formed from the data of the photo album and the order-associated information to the print system 12. The management system 6 also receives the status information of each piece of order information sent from the print system 12 and a delivery slip number (tracking number) used to track the delivery state of a delivered photo album, and updates the status of each piece of order information under management. The management system 6 also sends the status information and the delivery slip number (tracking number) to the shopping site 11.

The print system 12 receives the order information sent from the management system 6, which is formed from the order-associated information and the data of the photo album ordered by the user. The print system 12 converts the data of the photo album into print data to be printed by the printer 14 using laboratory system software (not shown). The management system 6 has a print control function of sending print data to the printer 14, a process management function of managing each process of creating a photo album using a bookbinder (not shown), and a delivery function of delivering a created photo album based on order-associated information. (Note that the bookbinder, or the like, used for bookbinding of a photo album will be omitted in this embodiment.)

In this embodiment, an example in which the PCs 2, 5, and 7 and the printer 14 are connected via the network 8 has been described. However, the present invention is not limited to this example. For example, a case in which the PCs 2, 5, and 7 and the printer 14 are connected via the Internet can also be considered in general. The present invention is also applicable in such a case.

Figure 2:
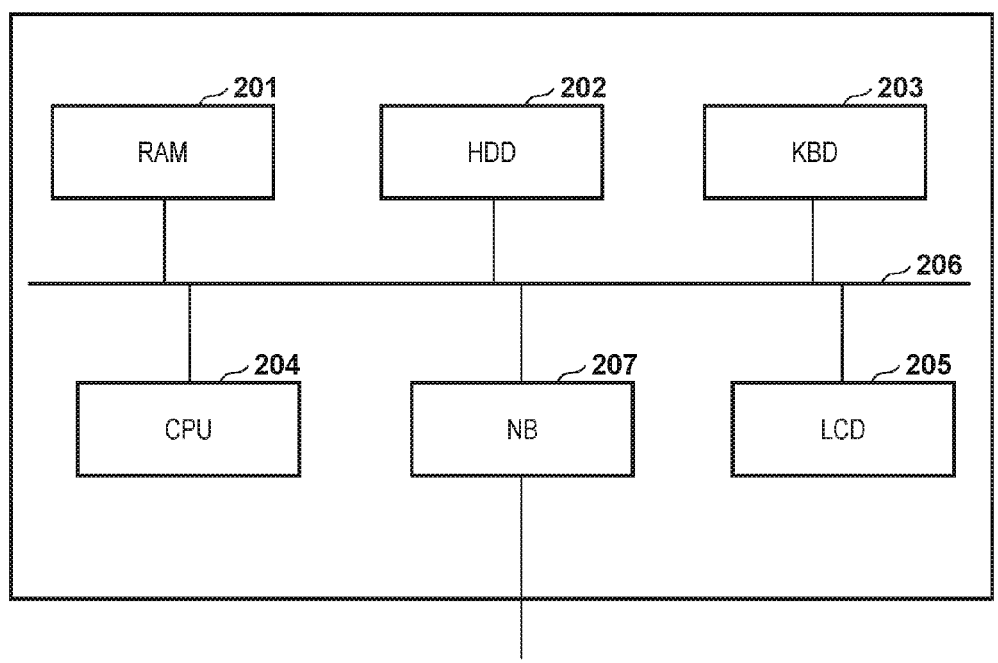
FIG. 2 is a block diagram showing an example of a hardware arrangement of a general personal computer (PC) or server.

FIG. 2 is a block diagram showing an example of the hardware arrangement of the PC. Each of the PCs 1, 2, 5, and 7 includes hardware as shown in FIG. 2. As shown in FIG. 2, the PCs 1, 2, 5, and 7 each include a RAM 201 that is a random access memory portion, an HDD 202 that is a hard disk drive portion, a KBD 203 that is a keyboard portion, and a CPU 204. The PCs 1, 2, 5, and 7 also each include an LCD 205 that is a display and an NB 207 that is a network board. The PCs 1, 2, 5, and 7 also each include a bus 206 that communicably connects at least the blocks shown in FIG. 2 to each other. The HDD 202 is a nonvolatile storage unit. Note that a portable CD-ROM, an internally provided ROM, or the like, may be used as a storage unit. The KBD 203 serves as an input unit in each of the PCs 1, 2, 5, and 7. The CPU 204 serves as a control unit in each of the PCs 1, 2, 5, and 7. The LCD 205 serves as a display unit in each of the PCs 1, 2, 5, and 7. The NB 207 serves as a communication control unit in each of the PCs 1, 2, 5, and 7.

Figure 3:
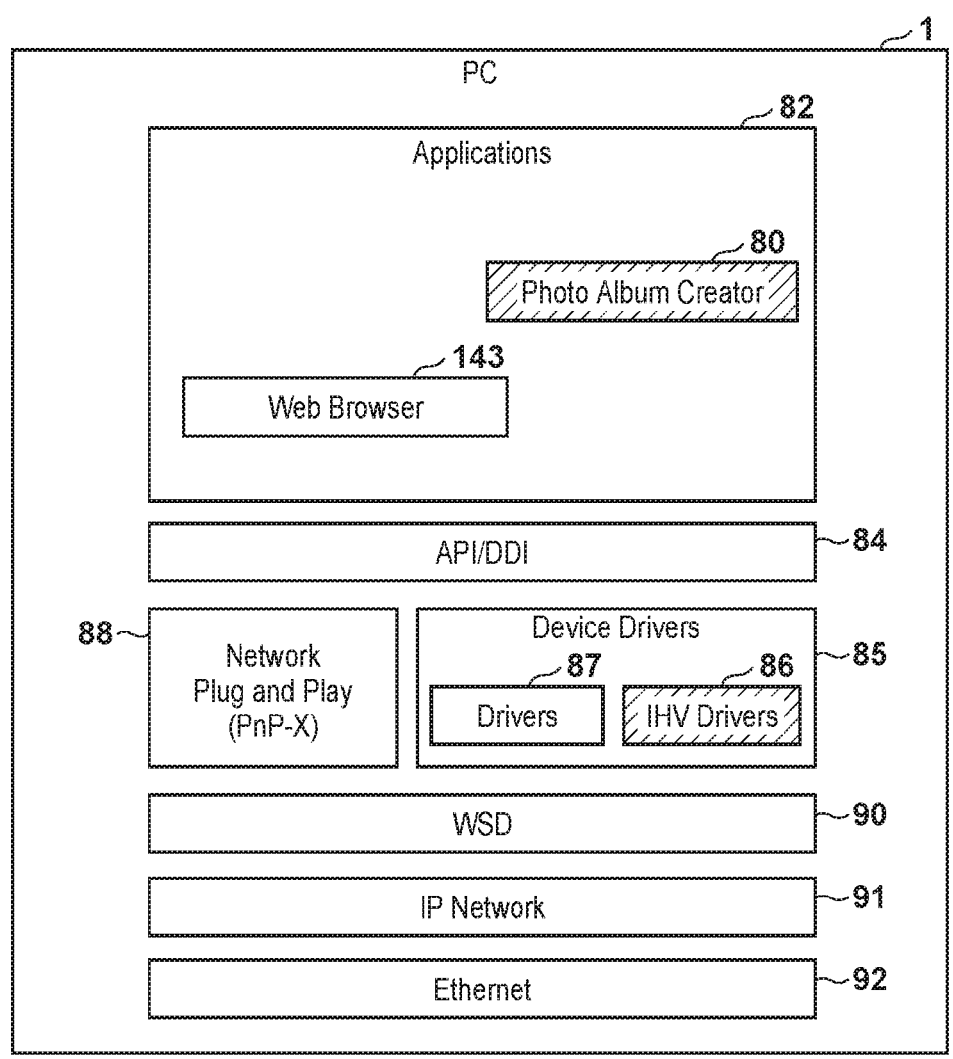
FIG. 3 is a block diagram showing an example of the software configuration of a PC.

Applications such as the photo album creator application 80 and the web browser 143 and modules (software) shown in FIG. 3 are stored in, for example, the HDD 202, read out to the RAM 201, and executed by the CPU 204 as needed. The CPU 204 thus implements the functions of various kinds of applications (software).

Each of the web server 9, the shopping site 11, the management system 6, and the print system 12 is stored in, for example, the HDD 202, read out to the RAM 201, and executed by the CPU 204 of a corresponding apparatus as needed. The CPU 204 of each apparatus thus implements functions of a corresponding one of the web server 9, the shopping site 11, the management system 6, and the print system 12.

FIG. 3 is a block diagram showing an example of the software module configuration of the PC. Referring to FIG. 3, a module 92 is an Ethernet® control stack that controls the Ethernet®. A module 91 is an IP network control stack that controls an IP network. A module 90 is a WSD (Web Service on Devices) control stack that controls a WSD configured to provide a mechanism for searching for a device on a network. A module 88 is a PnP-X control stack that controls the plug and play of the network. Note that PnP-X is short for Plug and Play Extensions that is a function featured as being standard in Windows® 8 as a series of extensions of plug and play, and provides support to a network connection device. A module 85 is a device driver group, including a standard driver group 87 packed with the OS as a standard and an IHV (Independent Hardware Vendor) driver group 86, provided by IHV.

A module 84 is an application/DDI interface including API (Application Programming Interface) and DDI (Device Driver Interface). The module 80 is, for example, a photo album creator application, and the module 143 is, for example, a web browser application. A module 82 is an application group including the photo album creator application 80 and the web browser 143.

Figure 4A:
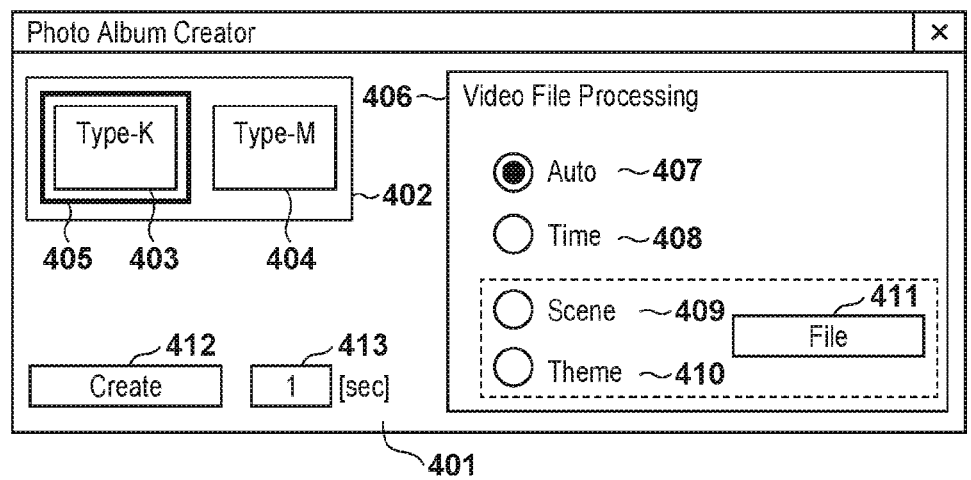
FIGS. 4A, 4B, and 4C are views showing examples of screens of an application.
Figure 4B:
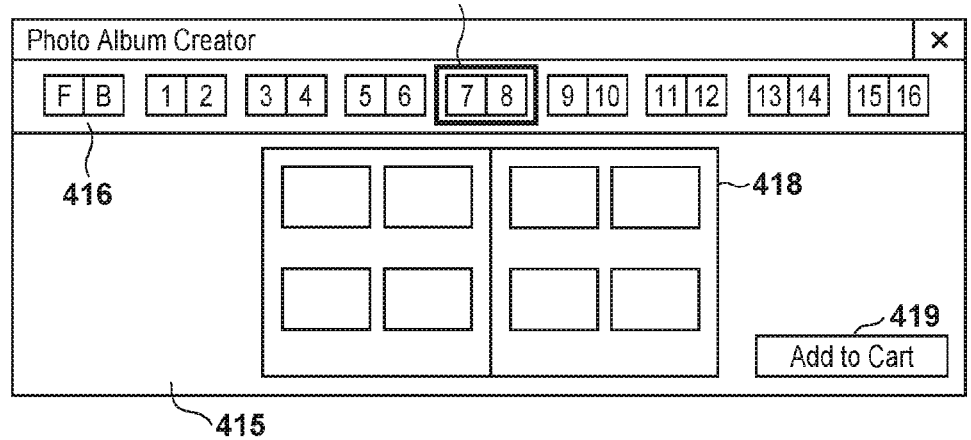
Figure 4C:
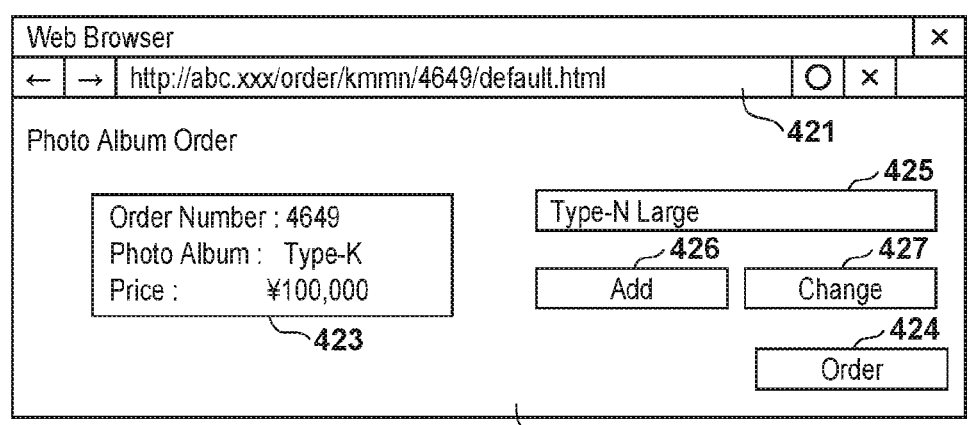

FIGS. 4A to 4C are views showing arrangement examples of the screens of various kinds of applications. FIG. 4A shows an example of the main screen of the application 80. FIG. 4B shows an example of the preview/editing screen of the application 80. FIG. 4C shows an example of a photo album order screen displayed on the web browser 143.

A main screen 401 shown in FIG. 4A is the main screen of the application 80. A photo album type selection portion 402 is a portion configured to select a photo album type, in which selection buttons used to accept photo album selection are displayed. In this embodiment, as for the photo album type, selection of one of type-K, type-M, type-N, type-N large, type-S, type-T, and type-U can be accepted as the type of a photo album to be created. Note that examples of the photo album types are a shape, paper type, binding type, and cover material. FIG. 4A shows a state in which type-K and type-M are displayed. Photo albums of other types can be displayed by scrolling the photo album type selection portion 402. The user can select one of the types. A button 403 is a photo album selection button used to accept selection of a photo album of type-K. An example of a photo album of type-K is as follows.

Shape: 15 cm×15 cm, square
Number of pages: 20
Paper type: satin
Binding type: two folding
Cover: soft A button 404 is a photo album selection button used to accept selection of a photo album of type-M. An example of a photo album of type-M is as follows.

Shape: A4 (210 cm×297 cm), portrait-oriented
Number of pages: 50
Paper type: glossy
Binding type: flat
Cover: hard An example of a photo album of type-N is as follows.
Shape: 15 cm×15 cm, square
Number of pages: 4
Paper type: glossy
Binding type: flat
Cover: hard An example of a photo album of type-N large is as follows.
Shape: 30 cm×30 cm, square
Number of pages: 4
Paper type: glossy
Binding type: flat
Cover: hard An example of a photo album of type-S is as follows.
Shape: 15 cm×15 cm, square
Number of pages: 4
Paper type: satin
Binding type: flat
Cover: hard An example of a photo album of type-T is as follows.
Shape: 15 cm×15 cm, square
Number of pages: 4
Paper type: glossy
Binding type: two folding
Cover: hard An example of a photo album of type-U is as follows.
Shape: 15 cm×15 cm, square
Number of pages: 4
Paper type: glossy
Binding type: flat
Cover: soft Type-N, type-N large, type-S, type-T, and type-U have interchangeability in shapes (sizes), paper types, binding types, and covers.

A mark 405 is a photo album selection state indicating mark, and is displayed to surround a photo album selection button associated with a selected photo album. FIG. 4A shows a state in which the user presses the button 403 to select a photo album of type-K. Note that the indicator is not limited to the mark 405 as long as it can identifiably indicate that a selection button is selected. Upon detecting the pressing of a photo album creation button 412 by the user, the application 80 starts automatic photo album creation. A moving image file processing method selection portion 406 is a portion configured to select a processing method for a moving image file, and accepts selection of one of "auto", "time", "scene", and "theme" by a radio button as a processing method of extracting a still image from a moving image.

Figure 8A:
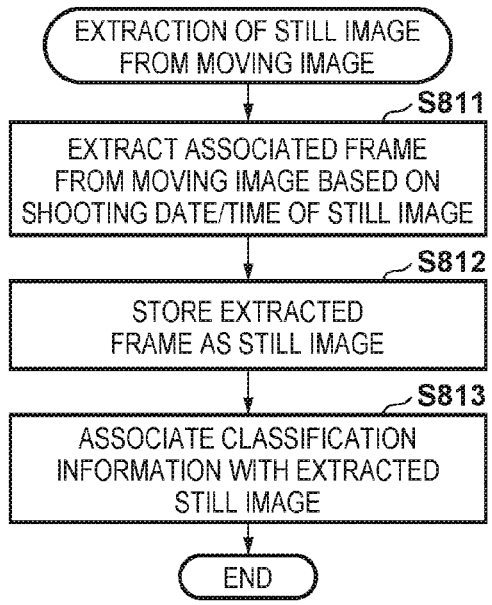
FIGS. 8A, 8B, and 8C are flowcharts showing processing of extracting a still image from a moving image.
Figure 8B:
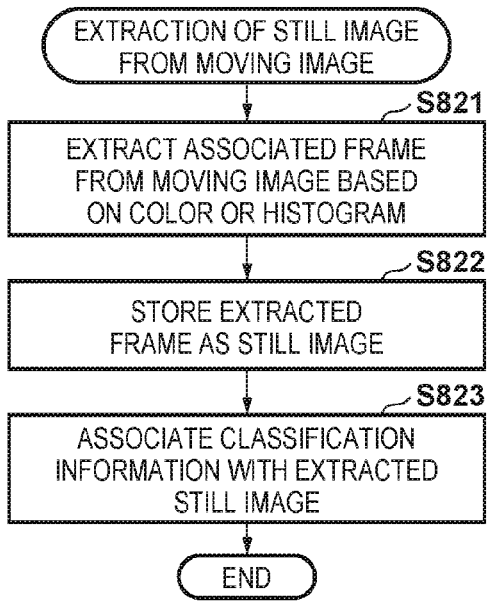
Figure 8C:
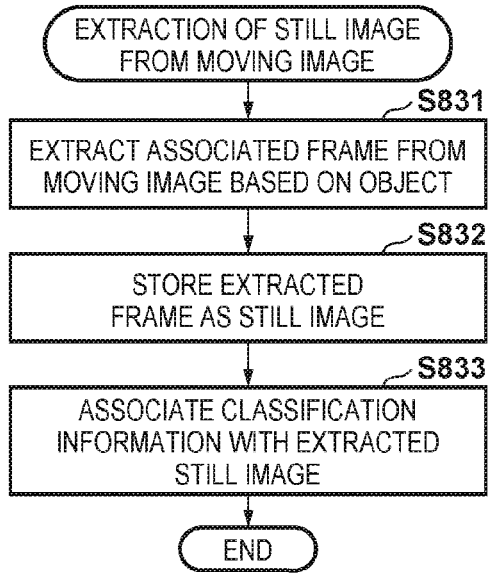

An auto selection button 407 corresponds to a method of executing automatic processing shown in FIG. 5 (to be described later) as a processing method of extracting a still image from a moving image. A time selection button 408 corresponds to a method of executing processing based on a shooting date/time as shown in FIG. 8A (to be described later) as a processing method of extracting a still image from a moving image. A scene selection button 409 corresponds to a method of executing scene determination processing based on a color or a histogram as shown in FIG. 8B (to be described later) as a processing method of extracting a still image from a moving image. A theme selection button 410 corresponds to a method of executing theme determination processing based on an object as shown in FIG. 8C (to be described later) as a processing method of extracting a still image from a moving image.

A file selection button 411 is enabled when the scene selection button 409 or the theme selection button 410 is selected. Upon detecting the pressing of the file selection button 411 by the user, a file selection screen (not shown) is displayed to allow the user to select a still image file. The application 80 temporarily stores the still image file selected by the user via the file selection screen (not shown) in a work memory in the RAM 201 used by the application 80. Upon detecting the pressing of the photo album creation button 412 by the user, the application 80 executes scene determination processing or theme determination processing based on the still image file temporarily stored in the work memory. A frame extraction time interval designation portion 413 can accept designation of a time interval to extract a still image from a moving image in, for example, a second step. Note that the default value is set to, for example, 1 sec.

An editing screen 415 shown in FIG. 4B is a preview/editing screen of the application 80. As will be described later in detail, according to conditions set on the screen shown in FIG. 4A, an image data group is obtained from a folder, a plurality of image data are selected from the obtained image data group, and images based on the image data are laid out on a template, thereby generating a layout image. Note that layout images corresponding to a plurality of pages are generated based on the number of pages accepted by the photo album type selection portion 402. Note that the application 80 displays, on a preview display portion 418, the preview of layout images for a selected double-page spread (that is, two pages) out of the generated layout images. A double-page spread selection portion 416 can accept, from the user, selection of a double-page spread to be displayed in the preview display portion 418. A display mark 417 capable of identifying a double-page spread selection state is displayed on a double-page spread selected by the user. Note that the indicator capable of identifying the selection state is not limited to this. For example, a selected double-page spread may be displayed in a different color. FIG. 4B shows a state in which a double-page spread formed from page 7 and page 8 is selected. Note that if the number of double-page spreads is large, other double-page spreads can be displayed by scrolling the double-page spread selection portion 416.

A purchase article addition button 419 can add a photo album to a shopping cart (not shown) as an article when the user purchases the photo album. Upon detecting the pressing of the purchase article addition button 419 by the user, the application 80 adds a photo album including a double-page spread displayed in the preview display portion 418 to the shopping cart. The user can purchase the photo album added to the shopping cart via an online order site shown in FIG. 4C associated with the shopping cart and a settlement site (not shown) that cooperates with the online order site. Note that the online order site, the settlement site, and the shopping cart are the same as a general online order site and a settlement site, and a shopping cart cooperating with the order site, and a description thereof will be omitted.

Referring to FIG. 4C, a URL setting portion 421 displayed on the web browser 143 accepts designation of the URL (Uniform Resource Locator) of a web site (page) that the user wants to display on the web browser 143. When the web browser 143 is displaying a web site (page), the URL of the displayed web site is displayed in the URL setting portion 421. An order screen 422 is a photo album order screen displayed on the web browser 143. FIG. 4C shows an example in which a photo album of order number "4649" is ordered. An order information display portion 423 displays information about an order of a photo album. Examples of the information about an order are an identifier (for example, an order number) for identifying an order, a photo album type, and a price. FIG. 4C shows the following example.

Order number: 4649
Photo album type: type-N
Price: ¥100,000

Upon accepting the pressing of an order button 424, an input screen used to input necessary information such as a name, an address, a telephone number, and a delivery destination is displayed. When the user inputs necessary information in the input screen and completes settlement in the settlement site, the order of the photo album created by the application 80 is determined, and the user can purchase the album.

FIGS. 10A to 10C show examples of the arrangements of photo albums. FIG. 10A shows an example of the arrangement of a photo album of type-K, and FIG. 10B shows an example of the arrangement of a photo album of type-M.

The photo album shown in FIG. 10A concerns a photo album of type-K, and includes a front cover 1001, a back cover 1004, a double-page spread 1002 including page 1 and page 2 of the body, and a double-page spread 1003 including page 19 and page 20 of the body. In the photo album of type-K, page 1 is the first page, and page 20 is the last page where the body is concerned.

The photo album shown in FIG. 10B concerns a photo album of type-M, and includes a front cover 1011, a back cover 1014, a double-page spread 1012 including page 1 and page 2 of the body, and a double-page spread 1013 including page 49 and page 50 of the body. In the photo album of type-M, page 1 is the first page, and page 50 is the last page where the body is concerned.

The photo album shown in FIG. 10C concerns a photo album of type-N, and includes a front cover 1021, a back cover 1024, a double-page spread 1022 including page 1 and page 2 of the body, and a double-page spread 1023 including page 3 and page 4 of the body. In the photo album of type-K, page 1 is the first page, and page 4 is the last page where the body is concerned.

Figure 11A:
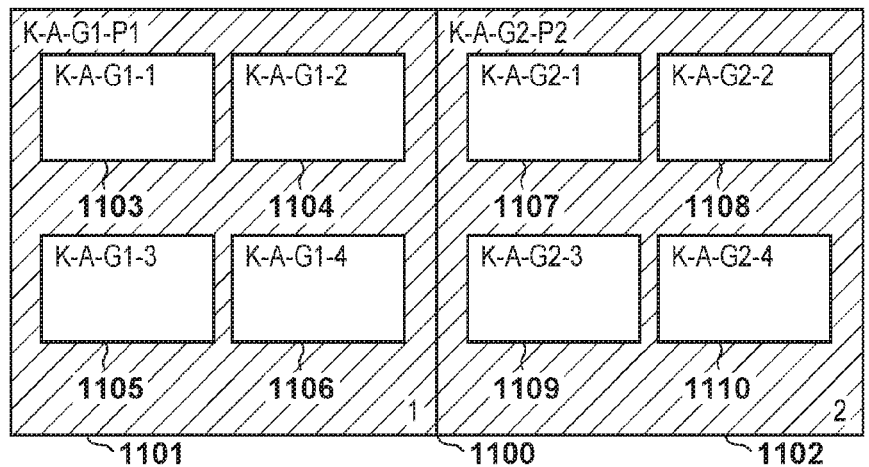
FIGS. 11A, 11B, and 11C are views showing examples of the arrangements of layout templates.
Figure 11B:
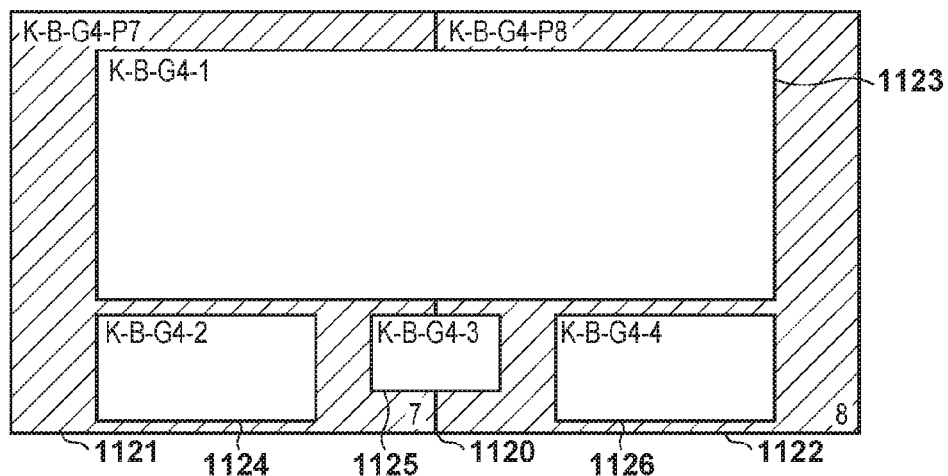
Figure 11C:
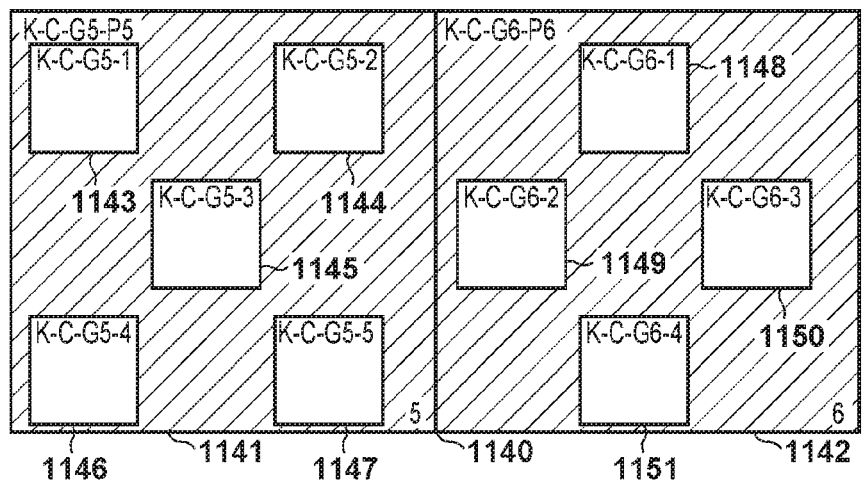

FIGS. 11A to 11C show examples of layout templates (also referred to as templates hereafter) used to lay out images based on image data. FIG. 11A shows an example of a time base layout template of a photo album of type-K. FIG. 11B shows an example of a scene base layout template of a photo album of type-K. FIG. 11C shows an example of a theme base layout template of a photo album of type-K.

FIG. 11A shows an example in which regions are put into a group on a page basis, and all slots in a group (one page on one side) belong to the regions of the same group. A layout template 1100 shown in FIG. 11A is, for example, the layout template of a double-page spread including page 1 and page 2 of the body in the time base layout template of a photo album of type-K. A template 1101 is the layout template of page 1 of the body. A template 1102 is the layout template of page 2 of the body. Slots 1103 to 1106 are slots laid out on page 1 of the body, and slots 1107 to 1110 are slots laid out on page 2 of the body. The application 80 lays out still images in these slots.

The slots 1103 to 1106 belong to the regions of group 1. A code K-A-G1-P1 added to the template 1101 represents the attribute of the template. K indicates that the template is used for a photo album of type-K. A indicates that the template is a time base template. G1 indicates that the template is used for the regions of group 1. P1 indicates that the template is used for page 1 of the body. Codes K-A-G1-1, K-A-G1-2, K-A-G1-3, and K-A-G1-4 added to the slots 1103 to 1106 represent the attributes of the slots. K-A-G1 is the same as described above, and the last number is a slot number. The slot number is assigned on a group basis.

The slots 1107 to 1110 belong to the regions of group 2. A code K-A-G2-P2 added to the template 1102 represents the attribute of the template. K and A are the same as described above, and G2 indicates that the template is used for the regions of group 2. P2 indicates that the template is used for page 2 of the body. Codes K-A-G2-1, K-A-G2-2, K-A-G2-3, and K-A-G2-4 added to the slots 1107 to 1110 represent the attributes of the slots. K-A-G2 is the same as described above, and the last number is a slot number. The slot number is assigned on a group basis.

FIG. 11B shows an example in which regions are put into a group on a double-page spread basis, and all slots in a group (double-page spread) belong to the regions of the same group. A layout template 1120 shown in FIG. 11B is, for example, the layout template of a double-page spread including page 7 and page 8 of the body in the scene base layout template of a photo album of type-K. A template 1121 is the layout template of page 7 of the body. A template 1122 is the layout template of page 8 of the body. A slot 1124 is a slot laid out on page 7 of the body. A slot 1126 is a slot laid out on page 8 of the body. Slots 1123 and 1125 are slots laid out across both page 7 and page 8 of the body. The application 80 lays out still images in these slots.

The slots 1123 to 1126 belong to the regions of group 4. A code K-B-G4-P7 added to the template 1121 and a code K-B-G4-P8 added to the template 1122 represent the attributes of the templates. K indicates that the template is used for a photo album of type-K. B indicates that the template is a scene base template. G4 indicates that the template is used for the regions of group 4. P7 indicates that the template is used for page 7 of the body. P8 indicates that the template is used for page 8 of the body. Codes K-B-G4-1, K-B-G4-2, K-B-G4-3, and K-B-G4-4 added to the slots 1123 to 1126 represent the attributes of the slots. K-B-G4 is the same as described above, and the last number is a slot number. The slot number is assigned on a group basis.

FIG. 11C shows an example in which regions are put into a group on a page basis, and all slots in a group (one page on one side) belong to the regions of the same group. A layout template 1140 shown in FIG. 11C is, for example, the layout template of a double-page spread including page 5 and page 6 of the body in the theme base layout template of a photo album of type-K. A template 1141 is the layout template of page 5 of the body. A template 1142 is the layout template of page 6 of the body. Slots 1143 to 1147 are slots laid out on page 5 of the body, and slots 1148 to 1151 are slots laid out on page 6 of the body. The application 80 lays out still images in these slots.

The slots 1143 to 1147 belong to the regions of group 5. A code K-C-G5-P5 added to the template 1141 represents the attribute of the template. K indicates that the template is used for a photo album of type-K. C indicates that the template is a theme base template. G5 indicates that the template is used for the regions of group 5. P5 indicates that the template is used for page 5 of the body. Codes K-C-G5-1, K-C-G5-2, K-C-G5-3, K-C-G5-4, and K-C-G5-5 added to the slots 1143 to 1147 represent the attributes of the slots. K-C-G5 is the same as described above, and the last number is a slot number. The slot number is assigned on a group basis.

The slots 1148 to 1151 belong to the regions of group 6. A code K-C-G6-P6 added to the template 1142 represents the attribute of the template. K-C indicates the same contents as described above, and G6 indicates that the template is used for the regions of group 6. P6 indicates that the template is used for page 6 of the body. Codes K-C-G6-1, K-C-G6-2, K-C-G6-3, and K-C-G6-4 added to the slots 1148 to 1151 represent the attributes of the slots. K-C-G6 is the same as described above, and the last number is a slot number. The slot number is assigned on a group basis.

The information of each of the layout templates shown in FIGS. 11A to 11C is prepared as data including vector information for designating the outer shape and position of an album and the shape and position of each slot, layer information representing how the templates or slots are overlaid, color information such as a background color, and image information such as a background pattern. The information about each layout template is incorporated in advance in the application 80 on the client side and the print system 12 on the server side. That is, information about a layout template stored in the application 80 on the client side and information about the layout template stored in the print system 12 on the server side have the same contents. Hence, information about a layout template with a large information (data) amount need not be sent from the application 80 to the management system 6 or the print system 12 via the Internet. As a result, it is possible to decrease the information amount of the data of a photo album to be sent from the application 80 to the print system 12 via the management system 6 to generate print data. In addition, since the time needed for data communication can be shortened, the waiting time of the user can be reduced, and excellent user operability can be attained. Furthermore, since the load in data sending/receiving decreases, the cost of the server that executes the management system 6 or the print system 12 can be reduced.

Figure 12A:
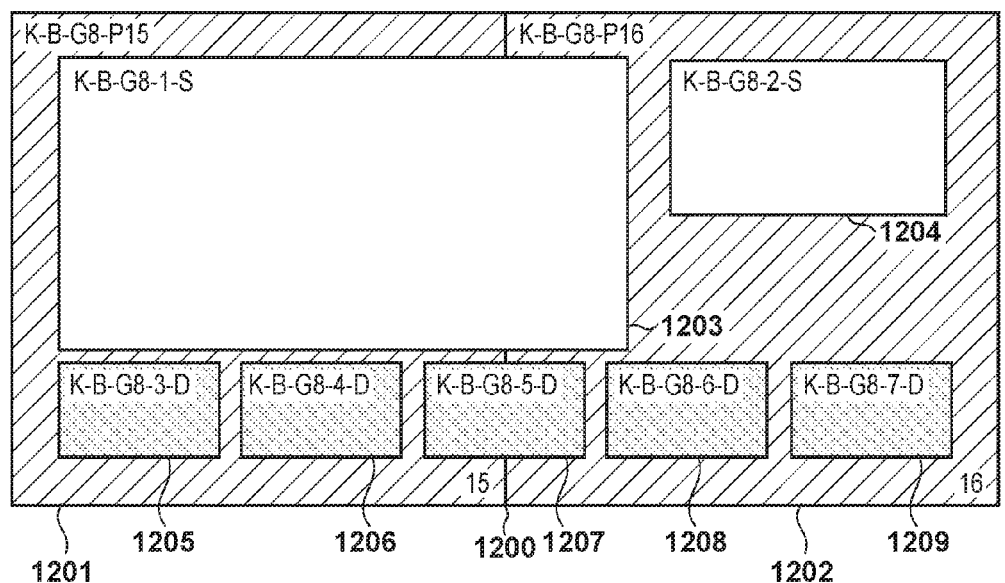
FIGS. 12A and 12B are views for explaining a method of managing slots on a layout template.
Figure 12B:
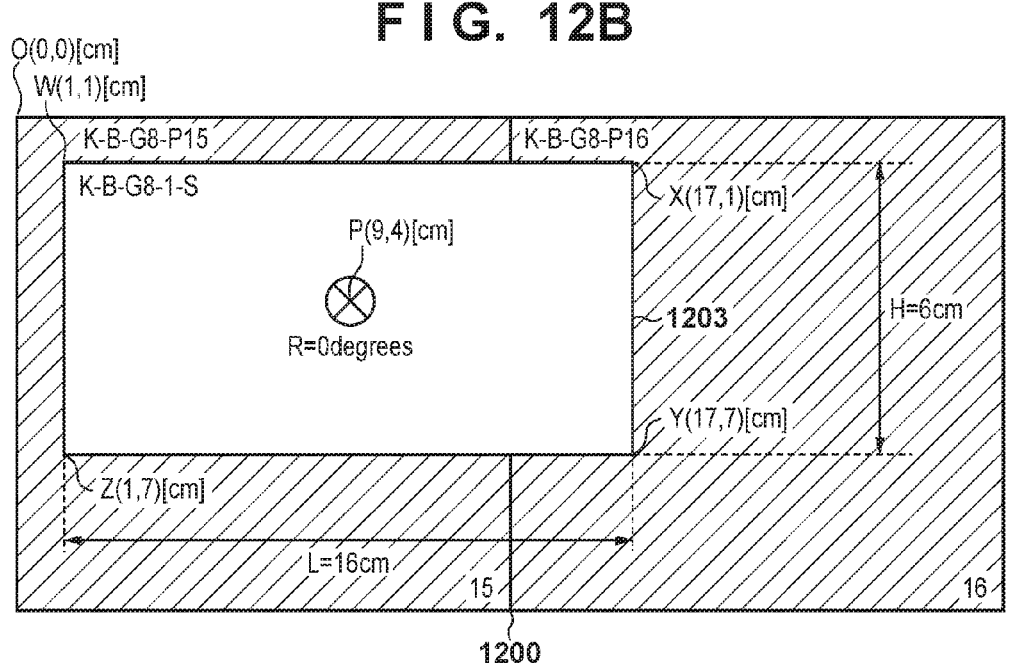

FIGS. 12A and 12B are views for explaining a layout template and slot management. FIG. 12A shows an example of the scene base layout template of a photo album of type-K. FIG. 12B shows an example of a slot management method. FIG. 12A shows a template in which regions are put into a group on a double-page spread basis, and all slots in a group belong to the regions of the same group, like the layout template shown in FIG. 11B. The template is used to lay out still images and still images extracted from a moving image in adequate slots.

A layout template 1200 shown in FIG. 12A is the layout template of a double-page spread including page 15 and page 16 of the body in the scene base layout template of a photo album of type-K. A template 1201 is the layout template of page 15 of the body. A template 1202 is the layout template of page 16 of the body. Slots 1205 and 1206 are slots laid out on page 15 of the body. Slots 1208 and 1209 are slots laid out on page 16 of the body. Slots 1203 and 1207 are slots laid out across both page 15 and page 16 of the body. The application 80 lays out still images in these slots.

The slots 1203 to 1209 belong to the regions of group 8. K indicates that the template is used for a photo album of type-K. B indicates that the template is a scene base template. G8 indicates that the template is used for the regions of group 8. P15 indicates that the template is used for page 15 of the body. P16 indicates that the template is used for page 16 of the body. A code K-B-G8-P15 added to the template 1201 and a code K-B-G8-P16 added to the template 1202 represent the attributes of the templates.

Codes (K-B-G8-1-S, and the like) added to the slots 1203 to 1209 represent the attributes of the slots. A number next to K-B-G8 is a slot number. The slot number is assigned on a group basis. The last character represents the attribute of an image to be laid out. S represents an attribute indicating that the slot is a slot for a general still image. The general still image means not a still image extracted from a moving image, but a photo, or the like, shot by a digital still camera, or the like, and stored. This will simply be referred to as a "still image" hereafter. D represents an attribute indicating that the slot is a slot for a still image extracted from a moving image by performing frame analysis, or the like. For example, a code K-B-G8-1-S is added to the slot 1203. Since the image attribute is S, an image suitable for layout in this slot is a general still image. Additionally, for example, a code K-B-G8-3-D is added to the slot 1205. Since the image attribute is D, an image suitable for layout in this slot is a still image extracted from a moving image. The still image extracted from a moving image will also be referred to as a "frame image" hereafter.

Note that if a still image suitable for layout in the slot 1203 suitable for a still image does not exist, a frame image extracted from a moving image may be laid out in this slot. If a frame image suitable for layout in the slot 1205 suitable for a frame image does not exist, a still image may be laid out in this slot.

In some cases, a plurality of frame images extracted from a moving image may include, for example, a frame image that is blurred a little, and is not so suitable for a photo album, and a still image whose quality is higher than that of the frame image blurred a little. Even in this case, in this embodiment, the frame image blurred a little is laid out as one of the continuous frame images extracted from the moving image in the slot of the attribute D suitable for a frame image. That is, the plurality of continuous frame images extracted from the moving image are laid out in the slots of the attribute D suitable for frame images. This makes it possible to automatically create a dynamic photo album exploiting the features of the layout template. It is also possible to provide a photo album creator application having a function of automatically generating an attractive photo album.

A method of managing the slots of the scene base layout template of a photo album of type-K shown in FIG. 12A will be described with reference to FIG. 12B. For descriptive convenience, slots other than the slot 1203 are not illustrated in FIG. 12B. In FIG. 12B, a point O is the reference point of the photo album. The application 80 defines the position of each slot using the upper left corner of the double-page spread of the photo album as the reference point, and manages/controls layout of an image in each slot. The application 80 defines a coordinate on the right side of the point O as a plus (+) horizontal coordinate, a coordinate on the left side as a minus (−) horizontal coordinate, a coordinate on the lower side as a plus (+) vertical coordinate, and a coordinate on the upper side as a minus (−) vertical coordinate. The coordinates of each point are expressed as (horizontal coordinate, vertical coordinate). For example, the coordinates of the point O are (0, 0) [unit: cm].

A point W is the reference point of the slot 1203, which matches the upper left corner of the slot. In this way, the reference point of each slot is set at the upper left corner of the slot. The point W exists 1 cm rightward away and 1 cm downward away from the point O. The coordinates are (1, 1) [unit: cm]. L is the width of the slot 1203, which is 16 cm. H is the height of the slot 1203, which is 6 cm. The points of the rectangle of the slot 1203 and their coordinates are a point X (17, 1) [unit: cm], a point Y (17, 7) [unit: cm], and a point Z (1, 7) [unit: cm]. A point P is the middle point of the slot 1203, and its coordinates are (9, 4) [unit: cm]. R is the rotation angle of the slot 1203. In the example of FIG. 12B, the slot 1203 is not rotated. Hence, the rotation angle is 0°. The application 80 thus defines each slot laid out in the layout template using its coordinates and rotation angle, and uses the information for management/control. The defined layout template information is managed as in a table shown in FIG. 15. That is, as shown in FIG. 15, the coordinates of the reference point, width (horizontal length) and height (vertical length), and the rotation angle of each slot are managed.

FIG. 15 shows an example of information about the positions of slots and images to be laid out. Slot position information 1501 represents information about the positions of slots. Slot is a slot number. Reference Point is the reference point of a slot. Length is the width of a slot (the horizontal length of a slot). Height is the height of a slot (the vertical length of a slot). Rotation is the rotation angle of a slot. Image information 1502 is information about an image to be laid out. Auto Photo Correction represents ON (true)/OFF (false) of automatic photo correction. Red Eye Correction represents ON (true)/OFF (false) of red eye correction. Trimming is trimming information. Angle is the rotation angle of an image. As for the trimming information, (x, y) indicates the reference point, and w×h indicates the number of pixels in the range of width×height from the reference point. FIG. 15 shows an example of the positions of the slots 1203 to 1209 of the layout template 1200 shown in FIG. 12A. The image information 1502 is not limited to the above-described example, and may include the status information of the image, size information in layout, and the like, in addition to the contents of correction processing in image processing. The information about the slots shown in FIG. 15 is included in information about the layout template.

Figure 5:
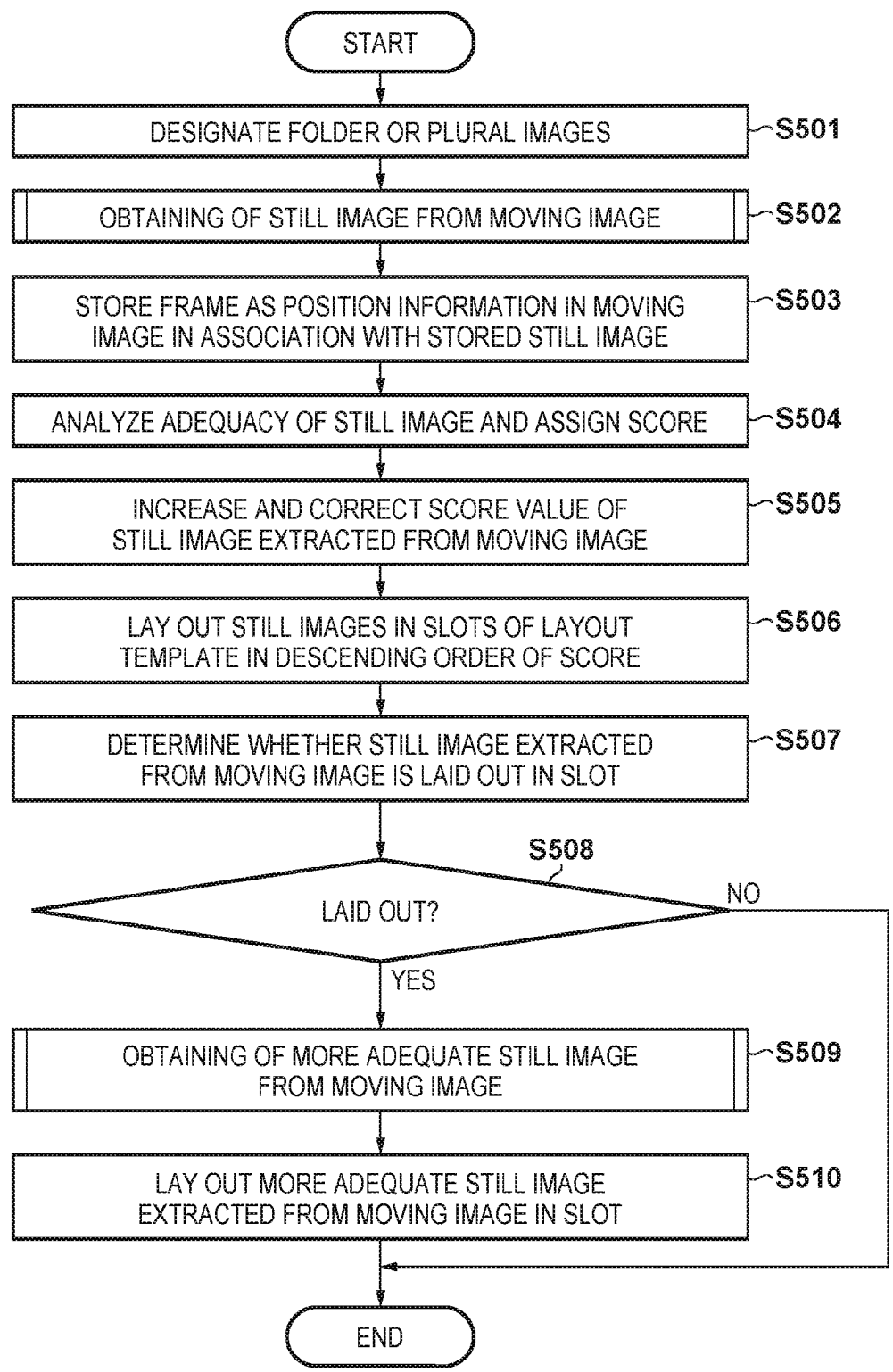
FIG. 5 is a flowchart showing automatic photo album creation processing.

FIG. 5 is a flowchart showing processing of automatically creating a photo album. An application program associated with the flowchart of FIG. 5 is stored in, for example, the HDD 202 and read out and executed by the CPU 204. When the application is activated, the screen shown in FIG. 4A is displayed. When the user selects the automatic selection button 407 shown in FIG. 4A, and the photo album creation button 412 accepts the pressing, the application 80 executes the processing in accordance with the flowchart shown in FIG. 5.

In step S501, the application 80 designates a folder (not shown) in the PC 1 in which still image files or moving image files are stored or files in the PC 1 as the storage location of an image data group or an image data group necessary when creating a photo album. Note that, in step S501, the user may be caused to select a folder in the PC 1 in which still images or moving images are stored or files in the PC 1.

In step S502, the application 80 executes processing of obtaining still images (frame images) from a moving image file and storing them. Details of the processing of this step will be described later with reference to FIG. 16A.

In step S503, for the still image stored in step S502, the application 80 stores the position information (frame number) of a frame in the moving image as the base of the still image in association with the still image. An example of the association will be described here with reference to FIGS. 17A and 17B.

FIGS. 17A and 17B show an example of association between frame images and a moving image and classification of frame images. Referring to FIGS. 17A and 17B, JPEG is the file name of a frame image, MPEG is the file name of an MPEG moving image, Date & Time is a shooting date/time, Info is information about classification, and Group is a classification result. Frame is a frame number that constitutes a moving image, and Related File is the file name of an associated file (moving image file/still image file) associated with a still image file or a moving image file. A frame image file described in the JPEG field is a still image file (frame image file) extracted from a moving image file described in the MPEG field of the same row and stored. The form of Date & Time represents a date and a time (1/1000 sec). For example, "20140330100010334" described in the Date & Time field of the row of dynamic15.jpg in FIG. 17A represents Mar. 30, 2014, 10:00:10 and 334/1000 sec. Note that in FIGS. 17A and 17B, "-" represents the absence of data. In this embodiment, for example, a frame number and a frame image are associated as shown in FIG. 17A.

In step S504, the application 80 performs analysis of each element shown in FIG. 14, which represents adequacy as an image for a photo album, for each still image in the image group necessary for creating a photo album. The "adequacy" is analyzed based on the criteria shown in FIG. 14.

FIG. 14 shows an example of the scores of still images. Referring to FIG. 14, File is a file name, Elements are elements (criteria) that define adequacy as an image for a photo album, and Score is the comprehensive score of each element. The score is an index derived from the point of each element in Elements and representing comprehensive adequacy for layout on a template.

Elements include Color (color), Contrast (contrast), Brightness (brightness), Focus (focus), and Composition (composition). Each element is expressed as a point on a scale of 0 (lowest) to 10 (highest), and represents adequacy as an image for a photo album. The point of each element is assigned based on a predetermined criterion. In this embodiment, for example, if the difference between the maximum value and the minimum value of luminance values in a still image corresponds to a predetermined level, a corresponding point is assigned as a contrast point. For example, if the evaluation result of a triangular composition based on objects in a still image corresponds to a predetermined level, a corresponding point is assigned as a composition point. For example, if the degree of sharpness of a change in the luminance distribution in a still image corresponds to a predetermined level, a corresponding point is assigned as a focus point. Note that the point assigning method is not limited to these. In FIG. 14, "-" represents the absence of data.

In this way, the application 80 calculates the score of each still image as an evaluation value representing the adequacy of each element and assigns it. The images assigned scores here are still images in still image files and still images stored in step S502. Note that, in step S504, both of the still images in the still image files and the still images extracted from the moving image file are assigned scores based on common evaluation criteria. In step S504, the application 80 also assigns a score to each still image extracted from the moving image and added in step S502 in accordance with the adequacy of each element as an image for a photo album.

In step S505, the application 80 corrects the score of each frame image extracted from the moving image. In step S505, the application 80, for example, multiplies the original score of each frame image extracted from the moving image by 1.2 to increase the score. The value of the weight used here is not limited to 1.2, and another empirically obtained value may be used. This value is defined in advance and held in the storage unit. When laying out a still image in each slot, the application 80 employs a higher one of the original score (Original) and the corrected score (Modified) shown in FIG. 14. The application 80 then lays out, in the slots of a template, still images as many as the slots.

In FIG. 14, Original is an original score that is the average value of the points of Color (color), Contrast (contrast), Brightness (brightness), Focus (focus), and Composition (composition). Modified is a score obtained by correcting the original score. In this embodiment, to express a weight representing the merit of a frame image extracted from a moving image as a score, the application 80, for example, multiplies the original score by 1.2 to increase the score.

As the merit, for example, when the original score value is increased, the possibility that the still image extracted from the moving image is specified as a layout target to the template can be increased. That is, for the frame image extracted from the moving image, a better still image may be obtained by performing extraction again. Hence, user satisfaction for a finally completed layout image can be improved.

When laying out a still image in each slot, the application 80 employs a higher one of the original score (Original) and the corrected score (Modified), and uses the score to specify a more adequate image as a layout target to the template. The application 80 then lays out, in the slots of the template, still images as many as the slots. This makes it possible to easily lay out a frame image with an original score lower than that of a still image as a layout image, because a high evaluation is obtained. A scene in which a moving image is shot is an impressive scene or a favorite scene for the user at a high possibility. Hence, when a frame image extracted from a moving image is laid out as a layout image, the possibility that the user satisfaction is improved becomes high.

Note that, in this embodiment, control is performed to multiply the original score of a still image extracted from a moving image by 1.2 to increase the score, thereby making the score of the still image extracted from the moving image higher than the score of a general still image. However, the control method is not limited to this and, for example, the score of the still image may be multiplied by 0.8 to decrease the score of the still image as compared to the score of the frame image. This can implement control to make the score of the frame image extracted from the moving image higher than the score of the still image.

In step S506, the application 80 lays out the still images in the slots of the layout template in descending order of score. The slots to lay out images may be determined in accordance with the order of numbers assigned to the slots or in accordance with priorities (scores) assigned to the slots themselves.

In step S507, the application 80 determines whether a frame image extracted from the moving image is laid out in a slot. Upon determining that a frame image extracted from the moving image is laid out in at least one of the slots (YES in step S508), the process advances to step S509. Upon determining that no frame image is laid out in any slot (NO in step S508), the processing procedure ends.

In step S509, the application 80 obtains more adequate still images from the moving image. In step S510, the more adequate still images (frame images) obtained from the moving image are laid out in the slots, and the processing procedure ends.

Processing of laying out images in slots and creating a photo album will be described below by exemplifying the layout template 1100 shown in FIG. 11A. For example, assume that in step S506, static1.jpg, static2.jpg, static3.jpg, and dynamic20.jpg are laid out in the slots 1107 to 1110 based on the scores shown in FIG. 14 (corresponding to FIG. 13A). In step S509, the application 80 executes processing (FIG. 16B) of obtaining a more adequate frame image as a layout target to the template from the moving image based on dynamic20.jpg laid out in the slot 1110 and storing the frame image. Based on position information (frame number) associated with dynamic20.jpg, the application 80 analyzes all frames included in a predetermined range of a predetermined time before and after the frame image from the moving image file of the source. The application 80 then extracts a more adequate frame for a photo album. As the predetermined range of the predetermined time before and after the frame image, for example, a range of a total of 2 sec including 1 sec before and 1 sec after is set.

FIGS. 13A to 13E show examples of the layout relationship between slots and still images. FIGS. 13A and 13B show the layout relationship between slots and still images in the template 1102. FIGS. 13C and 13D show the layout relationship between slots and still images in the template 1141. FIG. 13E shows the layout relationship between slots and still images in the layout template 1200. Referring to FIGS. 13A to 13E, Album Type is a type of a photo album, Group is a region (group) number, Page is a page number, Slot is a slot number, Attribute is the attribute of an image, and File is an original file name. In FIGS. 13A and 13B, slots of slot numbers 1 to 4 correspond to the slots 1107 to 1110, respectively. In FIGS. 13C and 13D, slots of slot numbers 1 to 5 correspond to the slots 1143 to 1147, respectively. In FIG. 13E, slots of slot numbers 1 to 7 correspond to the slots 1203 to 1209, respectively. In FIGS. 13A to 13E, "static*.jpg" (* is an arbitrary number) of an original file name represents a general still image such as a photo shot by a digital camera and stored. In addition, "dynamic*.jpg" (* is an arbitrary number) represents a still image extracted from a moving image.

At this time, to extract a more adequate frame, the application 80 performs scoring of the frame images using the elements shown in FIG. 14 and employs a frame of a higher original score (Original). The application 80 extracts a more adequate frame for a photo album and stores the extracted frame image as dynamic24.jpg.

In step S510, the application 80 removes dynamic20.jpg laid out in the slot 1110 from the slot 1110. The application 80 then lays out dynamic24.jpg more adequate for the photo album, which is stored in step S509, as a replacement in the slot 1110. As a result, the images shown in FIG. 13B are laid out in the slots 1107 to 1110. That is, the image of slot 4 in FIG. 13B is replaced. Then, the processing procedure ends. After the processing procedure, the application 80 displays the editing screen 415 shown in FIG. 4B.

As described above, it is possible to provide a photo album creator application that handles both still images and moving images together, automatically extracts a more adequate image, and lays it out without any cumbersome operation of the user.

In the above example, in step S505, the original score of a frame image extracted from a moving image is multiplied by 1.2 to increase the score, or the score of a normal still image is multiplied by 0.8 to decrease the score. This makes it possible to easily lay out a frame image. However, the present invention is not limited to this example. For example, a weight may be added to a score in accordance with quality based on an index such as the resolution of a moving image. More specifically, upon determining that the quality is high, the original score of a frame image extracted from the moving image may be multiplied by 1.5. For example, if the resolution is equal to or higher than a reference value, the quality may be determined to be high. Alternatively, a weight may be added to a score in accordance with quality based on an index such as the resolution of a still image. More specifically, if the quality is low, the original score of the still image may be multiplied by 0.5. With this arrangement, it is possible to flexibly control a score value representing adequacy as an image for a photo album.

In the above example, a score is assigned to each still image in step S504, and the score is corrected in step S505. However, the present invention is not limited to this arrangement, and a higher score may be assigned to a still image extracted from a moving image in step S504. For example, the PC stores, in the HDD 202, a first evaluation criterion that readily assigns a high score and a second evaluation criterion that readily assigns a score lower than that of the first evaluation criterion. In step S504, the CPU 204 may assign scores based on the first evaluation criterion to frame images extracted from a moving image, and assign scores based on the second evaluation criterion to other frame images.

In the above example, in step S510, dynamic20.jpg laid out in the slot 1110 is removed from the slot 1110, and dynamic24.jpg more adequate for a photo album, which is stored in step S509, is laid out as a replacement. However, the present invention is not limited to this control method. For example, the layout relationship between frame images and the slots of the template 1102 shown in FIG. 13B may be reexamined based on the original score (Original) of dynamic24.jpg. For example, assume that the original score (Original) of dynamic24.jpg is 7.5. In this case, the score (=original score) of the dynamic24.jpg is higher than the original score (7.0) of static3.jpg. Hence, the application 80 lays out dynamic24.jpg in slot 3 in FIG. 13B and static3.jpg in slot 4 in FIG. 13B. In this case as well, dynamic20.jpg is replaced and removed from the layout.

Figure 16A:
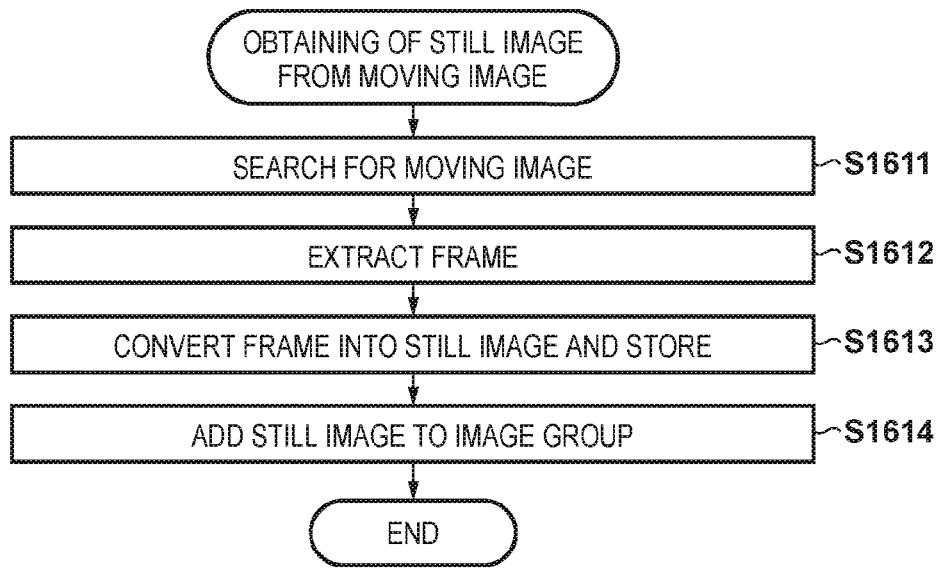
FIGS. 16A and 16B are flowcharts showing processing of obtaining a still image from a moving image.
Figure 16B:
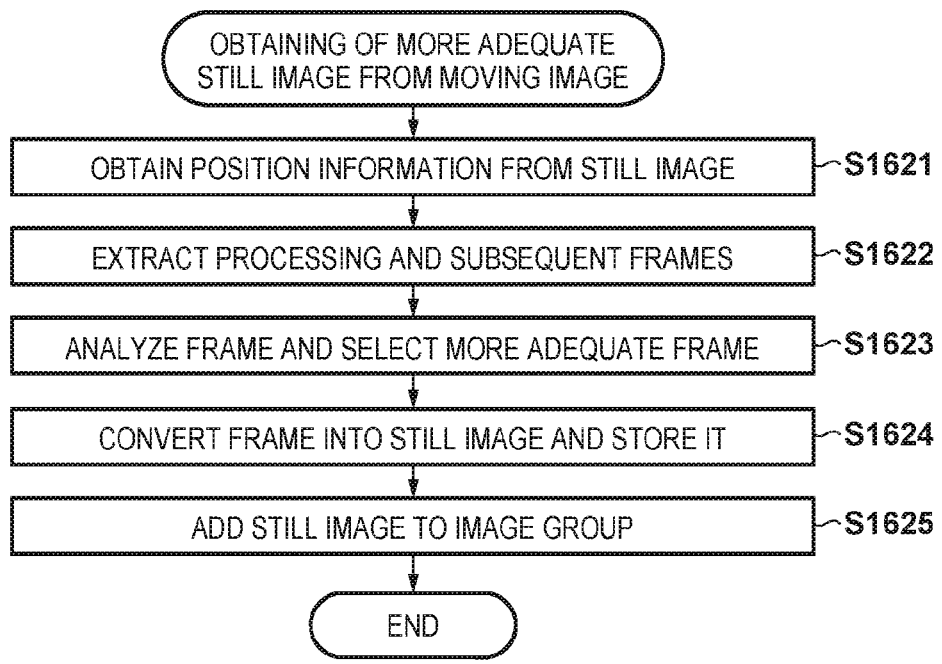

The processes of steps S502 and S509 will be described here in detail with reference to FIGS. 16A and 16B. FIGS. 16A and 16B are flowcharts showing processing of obtaining a frame image (still image) from a moving image and storing it. Programs associated with the flowcharts of FIGS. 16A and 16B are stored in, for example, the HDD 202 and read out and executed by the CPU 204. FIG. 16A is a flowchart showing an example of processing of obtaining a still image from a moving image and storing it, which corresponds to the process of step S502 in FIG. 5. FIG. 16B is a flowchart showing processing of obtaining a more adequate still image from a moving image and storing it, which corresponds to the process of step S509 in FIG. 5.

When the process of step S502 in FIG. 5 is executed, the application 80 starts the processing shown in FIG. 16A.

In step S1611, the application 80 searches for a moving image from still images or moving images stored in the folder designated in step S501 of FIG. 5 or an image data group designated in step S501 of FIG. 5.

In step S1612, the application 80 extracts a plurality of frames from the found moving image at a time interval designated in the frame extraction time interval designation portion 413 shown in FIG. 4A. Here, a default value, that is, 1 sec is set as the time interval designated in the frame extraction time interval designation portion 413.

In step S1613, the application 80 converts each extracted frame into a still image (JPEG file) and stores these still images (frame images). Note that, at this time, the CPU 204 may store each still image in the RAM 201 using, for example, a bitmap format, instead of converting a still image into a file. At this time, as shown in FIG. 17A, the application 80 stores, for each still image, the file name of the moving image from which the still image is extracted, and the position information (frame number) of a frame as the source of the still image in association with the still image. Note that, although the information of the moving image file from which the still image is extracted includes the full path of the storage location, the full path of the storage location is not illustrated in FIG. 17A.

In step S1614, the application 80 adds the still images to the image group necessary for creating a photo album. After that, the processing procedure ends.

For example, assume that, in step S506, static1.jpg, static2.jpg, static3.jpg, and dynamic20.jpg are laid out in the slots 1107 to 1110 based on the scores shown in FIG. 14 (corresponding to FIG. 13A). As shown in FIG. 17A, dynamic20.jpg is a file stored based on a frame extracted from video1.mp4. Note that video1.mp4 is a moving image file of MPEG4, and the frame rate is 30 fps (frames/sec).

When the process of step S509 in FIG. 5 is executed, the application 80 starts the processing shown in FIG. 16B based on dynamic20.jpg extracted from a moving image file and laid out in the slot 1110. The processing shown in FIG. 16B is processing of obtaining a frame image more adequate as a layout target to a template from a moving image and storing it.

In step S1621, the application 80 refers to the table shown in FIG. 17A, and obtains position information (frame number) associated with dynamic20.jpg.

In step S1622, based on the obtained position information (frame number), the application 80 extracts all frames included in a predetermined range of a predetermined time (for example, a total of 2 sec including 1 sec before and 1 sec after) before and after the frame image.

In step S1623, the application 80 analyzes all the extracted frames and selects a frame more adequate for a photo album. At this time, to select a more adequate frame, the application 80 performs scoring of the frame images using the elements shown in FIG. 14, and selects a frame of a higher original score (Original). For example, the application 80 selects the frame of the highest original score from the extracted frames. That is, the more adequate frame is determined here based on the score assigned to each image.

In step S1624, the application 80 converts the selected frame image into a still image (JPEG file), and stores the still image (frame image). Here, the application 80 selects a frame more adequate for a more adequate frame based on dynamic20.jpg serving as a reference, and stores the selected frame as dynamic24.jpg. After that, the processing procedure ends.

According to the above-described processing, when laying out a still image on a template, a high score is readily assigned to a frame image extracted from a moving image, and the still image is readily laid out on the template.

According to the above-described processing, high scores are preferentially assigned to a plurality of frame images extracted from a moving image, and an image having a high evaluation value in the plurality of frame images is laid out. It is, therefore, possible to lay out an adequate image with a little blur. As for a moving image, since many images (still images) are shot for a certain scene, an adequate image with a little blur may be included in these images. Hence, in this embodiment, a more adequate image is extracted and laid out in a slot of a template by the above-described method.

Figure 19A:
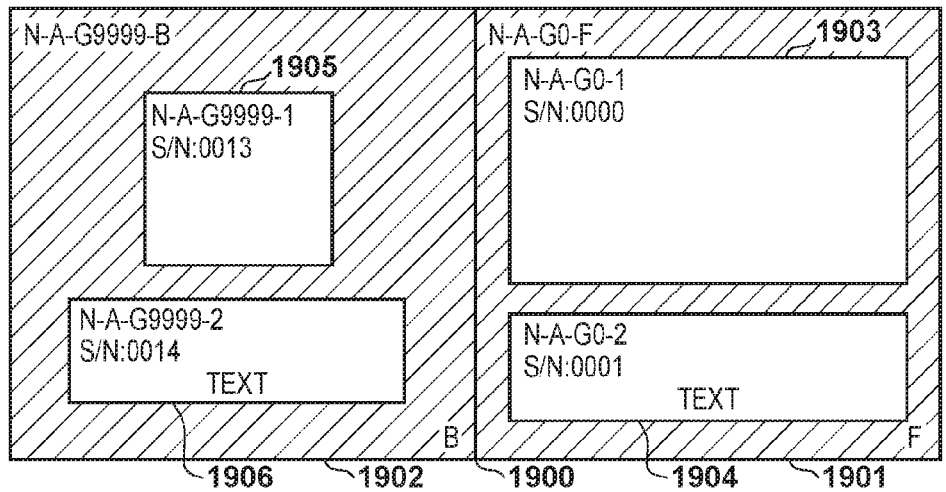
FIGS. 19A, 19B, and 19C are views showing an example of the arrangement of a layout template.
Figure 19B:
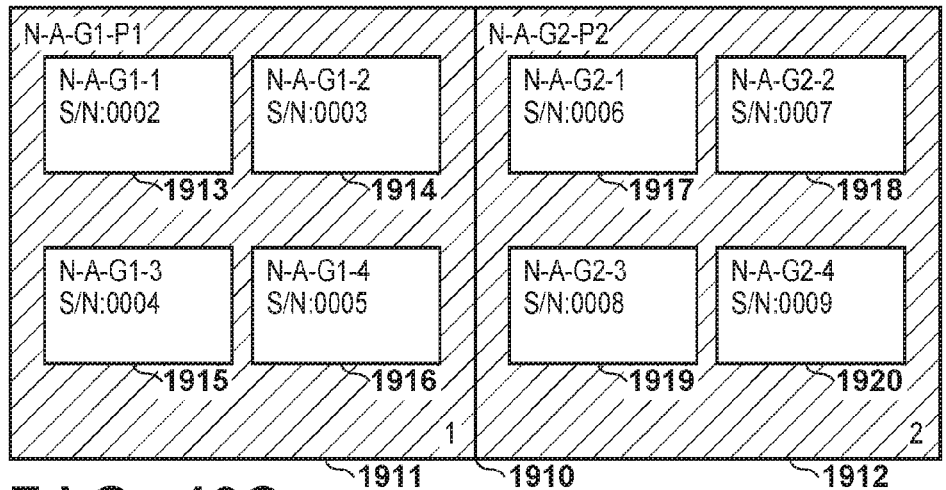
Figure 19C:
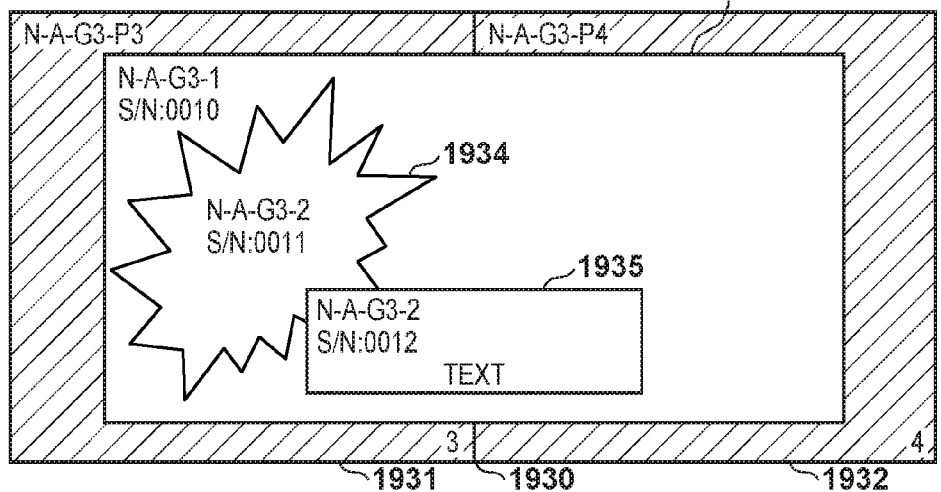

FIGS. 19A, 19B, and 19C show examples of a time base layout template of a photo album of type-N. A layout template 1900 shown in FIG. 19A is, for example, the layout template of a front cover and a back cover in a time base layout template of a photo album of type-N. In the layout template 1900, regions are put into a group on a page basis, and all slots in a group (one page on one side) belong to the regions of the same group. N-A-G9999 represents the attribute of the layout template. This information is used as a template ID. A template 1901 is the layout template of the front cover. A template 1902 is the layout template of the back cover. Slots 1903 and 1904 are slots laid out on the front cover. The application 80 lays out a still image or a text such as a character or a character string in each slot.

A code N-A-G0-F added to the template 1901 represents the attribute of the template. N indicates that the template is used for a photo album of type-N. A indicates that the template is a time base template. G0 indicates that the template is used for the regions of group 0. F indicates that the template is used for the front cover. The slots 1903 and 1904 belong to the regions of group 0. Codes N-A-G0-1 and N-A-G0-2 added to the slots 1903 and 1904 represent the attributes of the slots. N-A-G0 is the same as described above, and the last number is a slot number. The slot number is assigned on a group basis.

The slot 1904 is a slot for a text such as a character or a character string. Not a still image or a still image generated from a moving image, but a text such as a character or a character string input by the user, is laid out in this slot. Note that, as the method of causing the user to input a text such as a character or a character string, a known input method is usable. N-A-G0 represents the attribute of the layout template. This information is used as a template ID. The template ID is identification information used to uniquely identify each template in the print system. Use of the identification information will be described later with reference to FIGS. 21A and 21B.

N-A-G9999-B added to the template 1902 represents the attribute of the template. N-A is the same as described above. G9999 indicates that the template is used for the regions of group 9999. B indicates that the template is used for the back cover. Slots 1905 and 1906 are slots laid out on the back cover. The application 80 lays out a still image or a text such as a character or a character string in each slot. The slots 1905 and 1906 belong to the regions of group 9999. Codes N-A-G9999-1 and N-A-G9999-2 added to the slots 1905 and 1906 represent the attributes of the slots. N-A-G9999 is the same as described above, and the last number is a slot number. The slot number is assigned on a group basis. The slot 1906 is a slot for a text such as a character or a character string. Not a still image or a still image generated from a moving image, but a text such as a character or a character string input by the user, is laid out in this slot.

A layout template 1910 shown in FIG. 19B is an example in which regions are put into a group on a page basis, and all slots in a group (one page on one side) belong to the regions of the same group. N-A-G2 represents the attribute of the layout template. This information is used as a template ID. The layout template 1910 is, for example, the layout template of a double-page spread including page 1 and page 2 of the body in a time base layout template of a photo album of type-N. A template 1911 is the layout template of page 1 of the body. A template 1912 is the layout template of page 2 of the body. Slots 1913 to 1916 are slots laid out on page 1 of the body. The application 80 lays out still images in these slots. A code K-A-G1-P1 added to the template 1911 represents the attribute of the template. K indicates that the template is used for a photo album of type-K. A indicates that the template is a time base template. G1 indicates that the template is used for the regions of group 1. P1 indicates that the template is used for page 1 of the body. The slots 1913 to 1916 belong to the region of group 1. Codes N-A-G1-1, N-A-G1-2, N-A-G1-3, and N-A-G1-4 added to the slots 1913 to 1916 represent the attributes of the slots. N-A-G1 is the same as described above, and the last number is a slot number. The slot number is assigned on a group basis. N-A-G1 represents the attribute of the layout template. This information is used as a template ID.

Slots 1917 to 1920 are slots laid out on page 2 of the body. The application 80 lays out still images in these slots. A code N-A-G2-P2 added to the template 1912 represents the attribute of the template. N-A is the same as described above. G2 indicates that the template is used for the regions of group 2. P2 indicates that the template is used for page 2 of the body. The slots 1917 to 1920 belong to the region of group 2. Codes N-A-G2-1, N-A-G2-2, N-A-G2-3, and N-A-G2-4 added to the slots 1917 to 1920 represent the attributes of the slots. N-A-G2 is the same as described above, and the last number is a slot number. The slot number is assigned on a group basis.

A layout template 1930 shown in FIG. 19C is, for example, the layout template of a double-page spread including page 3 and page 4 of the body in a time base layout template of a photo album of type-N. The color (background color) of the template is blue, and the template is patterned with a hounds-tooth check. A template 1931 is the layout template of page 3 of the body. A template 1932 is the layout template of page 4 of the body. A slot 1934 is a slot laid out on page 3 of the body. Slots 1933 and 1935 are slots laid out across both page 3 and page 4 of the body. The application 80 lays out a still image or a text such as a character or a character string in each slot.

The slots 1933 to 1935 belong to the regions of group 3. A code N-A-G3-P3 added to the template 1931 and a code N-A-G3-P4 added to the template 1932 represent the attributes of the templates. N indicates that the template is used for a photo album of type-N. A indicates that the template is a time base template. G3 indicates that the template is used for the regions of group 3. P3 indicates that the template is used for page 3 of the body. P4 indicates that the template is used for page 4 of the body. Codes N-A-G3-1, N-A-G3-2, and N-A-G3-3 added to the slots 1933 to 1935 represent the attributes of the slots. N-A-G3 is the same as described above, and the last number is a slot number. The slot number is assigned on a group basis.

The slot 1934 is an odd-form slot having a shape different from a rectangle. When such an odd-form slot is expressed as vector data, the information amount of data is enormous as compared to, for example, a rectangular slot. The slot 1935 is a slot for a text such as a character or a character string. Not a still image or a still image generated from a moving image, but a text such as a character or a character string input by the user, is laid out in this slot. The templates 1931 and 1932 and the slots 1933 to 1935 are laid out in different layers. The templates 1931 and 1932 are laid out in layer 0 of the lowest level. The slot 1933 is laid out in layer 1 immediately above layer 0. The slot 1934 is laid out in layer 2 immediately above layer 1. The slot 1935 is laid out in layer 3 that is the layer of the highest level. In this embodiment, the templates and the slots are distributed to different layers and laid out in a superimposed manner. For example, the large slot 1933 having a rectangular shape is laid out on the templates 1931 and 1932 that are blue and are patterned with a hounds-tooth check to composite a still image dynamic88.jpg (0010.dat) shown in FIG. 20. In addition, the odd-form slot 1934 is laid out on the slot 1933 to composite a still image static77.jpg (0011.dat) shown in FIG. 20. Note that when generating a layout image, the still image static77.jpg (0011.dat) is trimmed in accordance with the shape of the slot 1934. Furthermore, the rectangular slot 1935 for a text is laid out on the slot 1934 to composite text data (0012.dat) shown in FIG. 20. As a result, a still image generated from a moving image is laid out on the templates having a color and a pattern (blue and pattered with a hounds-tooth check), a still image is laid out on the still image, and a text is further laid out on the still image. This can implement a template on photo, photo on photo, or photo on text.

The template 1930 is an example in which regions are put into a group on a double-page spread basis (a basis of two pages), and all slots in a group (double-page spread) belong to the regions of the same group. N-A-G3 represents the attribute of the layout template. This information is used as a template ID. In a template that includes an odd-form slot or expresses a plurality of layers in a superimposed manner, like the template 1930, information necessary for expressing the template is enormous and complex, and the information amount of the template is enormous.

In FIGS. 19A, 19B, and 19C, S/N indicates a serial number that is assigned to each slot based on a rule defined by the application 80 itself, like 0000, 0001, 0002, . . . , for convenience sake. The serial number is not included in the information representing the layout template and not illustrated in the drawing for convenience sake. That is, when the application 80 or the print system 12 loads layout template information, the serial number is not loaded because the information of the serial number is not included in it.

Figure 22A:
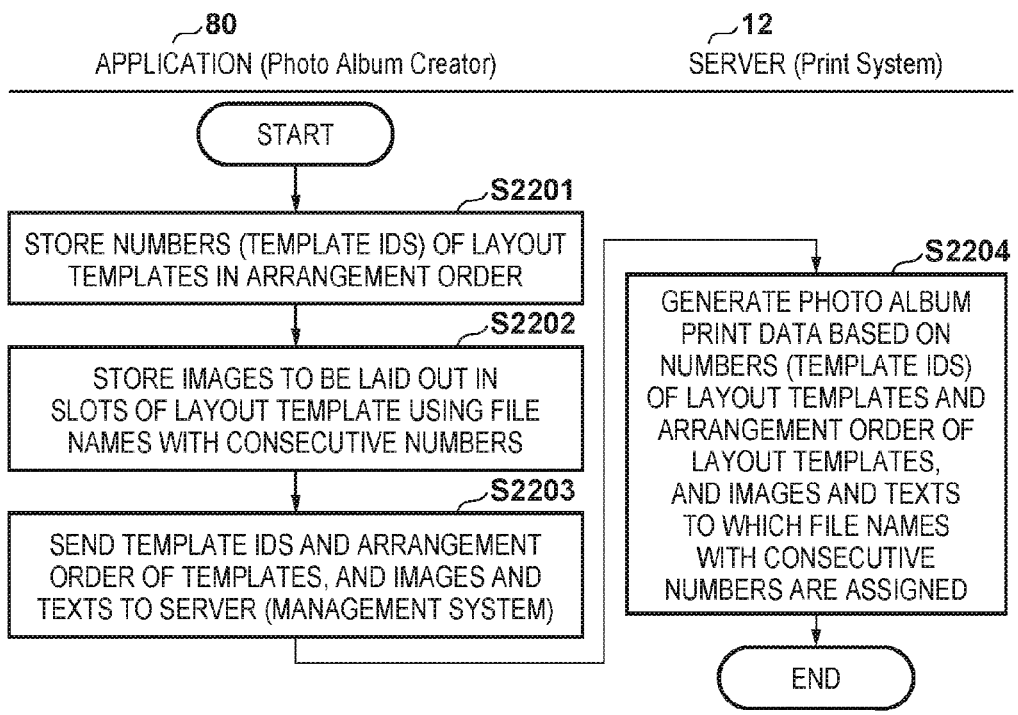
FIGS. 22A and 22B are flowcharts showing processing of generating photo album print data.
Figure 22B:
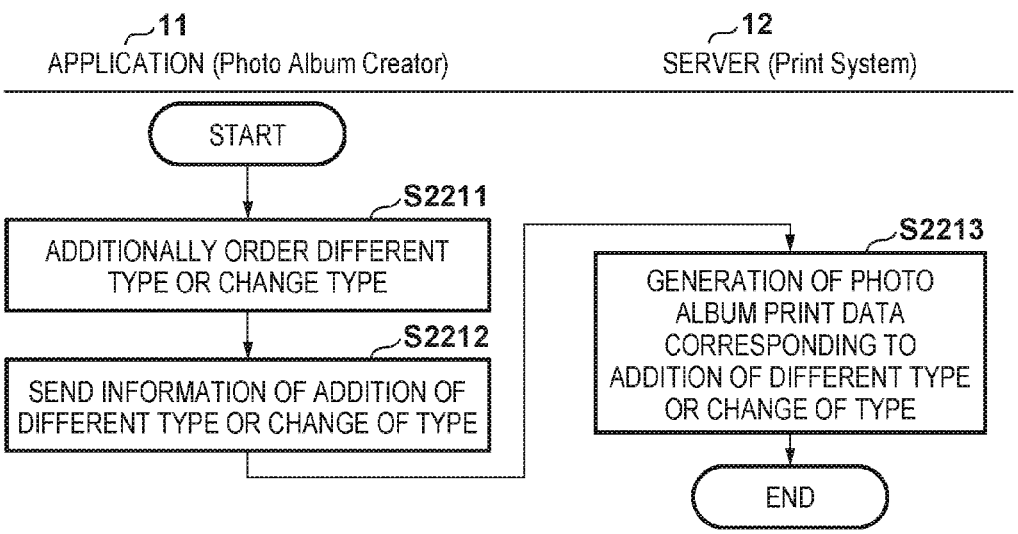

FIGS. 22A and 22B are flowcharts showing examples of processing of generating photo album print data. Programs associated with the flowcharts of FIGS. 22A and 22B are stored in, for example, the HDD 202, read out to the RAM 201, and executed by the CPU 204. FIG. 22A is a flowchart showing an example of processing of generating photo album print data by the print system 12. When the user presses the purchase article addition button 419 shown in FIG. 4B, the processing shown in FIG. 22A starts. That is, upon accepting the pressing of the purchase article addition button 419, the CPU 204 determines the layout of all double-page spreads of a photo album and starts the processing shown in FIG. 22A. Note that, when the layout is determined, images to be used for the album and the layout template to be used are determined.

In step S2201, the application 80 stores the numbers (template IDs) of layout templates as information about a photo album in the arrangement order of pages.

Figures 21A, 21B:
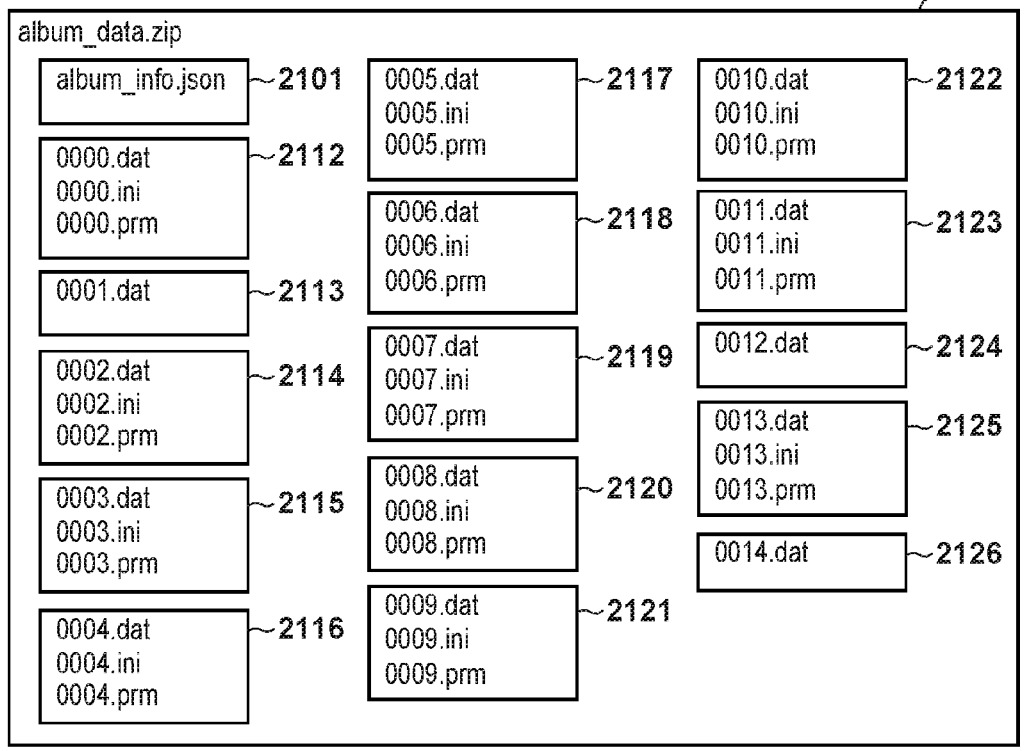
FIGS. 21A and 21B are views showing examples of the arrangement of the data of a photo album.

The layout information of a photo album will be described here with reference to FIG. 21A. FIGS. 21A and 21B show examples of the data of a photo album. FIG. 21A shows an example of information about a photo album. Photo album information 2101 (layout information 2101) shown in FIG. 21A is a file in the JSON format named album_info.json, in which the information of a photo album of type-N is described. Page information 2105 describes pieces of information about the pages of the photo album in the order of front cover, body, and back cover. Note that, in a case of, for example, a photo album with a still image or text data printed on the spine of the photo album, the page information 2105 describes pieces of information about the pages in the order of front cover, body, spine, and back cover. Template ID information 2102 describes the template ID of the front cover. In FIG. 21A, "N-A-G9999", which is the template ID of the template 1902 shown in FIG. 19A, is described. Template ID information 2103 describes the template IDs of pages included in the body in the page order. In FIG. 21A, "N-A-G1", "N-A-G2", and "N-A-G3", which are the template IDs of the templates 1911, 1912, and 1931 (1932) shown in FIG. 19C, are described in the page order. Template ID information 2104 describes the template ID of the back cover. In FIG. 21A, "N-A-G0", which is the template ID of the template 1901 shown in FIG. 19A, is described. That is, in step S2201, the application 80 stores the pieces of identification information of the layout templates in the pieces of the template ID information 2102 to 2104 in the page information 2105 of the photo album information 2101 in the arrangement order of pages.

The print system 12 can specify the layout template used in each page of the photo album and the page order based on the page information 2105 and the pieces of template ID information 2102 to 2104 described in the photo album information 2101. In the example of FIG. 21A, the layout template used in each page and the page order are as follows.

N-A-G0
N-A-G1
N-A-G2
N-A-G3
N-A-G9999

In step S2202, the application 80 stores images to be laid out in the slots of the layout templates using file names with consecutive numbers, as shown in FIGS. 20 and 21B.

FIG. 20 shows the layout relationship between slots and still images. FIG. 20 shows the layout relationship between still images or text data and the slots of the layout templates 1900, 1910, and 1930 shown in FIGS. 19A, 19B, and 19C. Album Type is a type of a photo album. Group is a region (group) number. Page is a page number. Slot is a slot number. File is an original file name. Data is the file name of a still image or text data included in the data of the photo album to be sent from the application 80 to the management system 6. In FIG. 20, slots of slot numbers 1 and 2 in page number F correspond to the slots 1903 and 1904, respectively. Slots of slot numbers 1 to 4 in page number 1 correspond to the slots 1913 to 1916, respectively. Slots of slot numbers 1 to 4 in page number 2 correspond to the slots 1917 to 1920, respectively. Slots of slot numbers 1 to 3 in page number 3 or 4 correspond to the slots 1933 to 1935, respectively.

In FIG. 20, "static*.jpg" (* is an arbitrary number) of an original file name represents a normal still image, and "dynamic*.jpg" (* is an arbitrary number) represents a still image extracted from a moving image. "-" represents an absence of an image (in a case of text data). Each of text data 0001.dat, 0012.dat, and 0014.dat is, for example, data formed from color information and a set of point coordinates (outline) configured to express a Bezier curve, which is data capable of expressing a text, such as a character or a character string. Note that text data is not limited to this example, and may be, for example, data that combines a binary image and color information or data that combines a font, a size, and color information. In this case, the same font is stored in the application 80 and the print system 12 in advance, and the application 80 generates data that combines a font name, a size, and color information as text data.

The application 80 renames each still image to be included in the data of the photo album based on a rule defined by itself and stores the still image in the data of the photo album. As for the rule, the pages are arranged in the order of front cover→body→back cover, and numbers are sequentially assigned to the slots from the slots in the front cover up to the slots in the back cover. For example, in the example shown in FIGS. 19A, 19B, and 19C, the pages are arranged in the order of the front cover, page 1, page 2, page 3, and page 4 of the body, and the back cover, and numbers 0000, 0001, 0002, . . . , 0013, and 0014 are temporarily sequentially assigned to the slots. Note that the numbers assigned here are four-digit numbers, but are not limited to these, and the number assigning system is not limited to this.

If a still image is assigned to a slot, the application 80 renames the file name of the still image using a number assigned to the slot. The application 80 then stores the file after the renaming in the data of the photo album. For example, the application 80 renames static1.jpg to 0000.dat. If text data is assigned to a slot, the application 80 outputs the text data to a file named, for example, 0001.dat using a number assigned to the slot, and the file in the data of the photo album.

Note that, in this embodiment, an example of a photo album formed from a front cover, a body, and a back cover has been described. However, the present invention is not limited to this example, and is also applicable to a photo album formed from, for example, a front cover, a body, a spine, and a back cover. In this embodiment, an example in which a still image or text data is assigned to each slot has been described. However, the present invention is not limited to this example and, for example, an application for assigning a region to print a barcode for merchandise management to a slot is also possible.

Album data 2110 shown in FIG. 21B is a data set including the photo album information 2101 and layout data 2112 to 2126 concerning still images and text data to be laid out in the slots. The layout data 2112 is formed from a still image to be laid out in the slot 1903 of the front cover of the photo album of type-N, the layout method of the still image, and information about image correction. In the layout data 2112, 0000.dat is a still image, and as its file name, a file name obtained by renaming the file name of static1.jpg to be laid out in the slot 1903 is used. As for this data, a number temporarily assigned to each slot based on a rule defined by the application 80 itself, as shown in FIGS. 19A, 19B, and 19C, is used as part of the file name (a portion other than the extension). 0000.ini is the image layout information of the still image to be laid out in the slot 1903. This information stores, for example, the same information as that described in the image information 1502 in correspondence with each slot as a set value when static1.jpg is laid out in the slot 1903. As for the image layout information, a number temporarily assigned to each slot based on a rule defined by the application 80 itself, as shown in FIGS. 19A, 19B, and 19C, is used as part of the file name (a portion other than the extension).

For example, when the application 80 performs trimming of an image, the trimming information is included in the image layout information, and the image layout information is sent to the print system 12 via the management system 6. When the print system 12 lays out a still image assigned to each slot, trimming is performed based on the above-described trimming information, and the trimmed image is laid out in the slot. The preview of the photo album displayed in the preview display portion 418 of the application 80 and the print result of the photo album printed and bound by the print system 12 and the printer 14 can thus be made equal concerning the layout of the still images in the slots.

A file 0000.prm is parameter information for image processing, or image correction such as automatic photo correction or red eye correction. When enabling correction or executing image processing for static1.jpg to be laid out in the slot 1903, parameters used for the correction or image processing are stored in 0000.prm. The parameter information includes, for example, coordinates of a face detection result, and the like. Note that the face detection may be performed for the actual image of static1.jpg, or may be performed for, for example, a still image obtained by resizing the short side of static1.jpg to several hundred pixels. When face detection is performed for the small resized still image, the face detection processing can be sped up. Note that the face detection result at this time may be stored as a parameter. When performing automatic photo correction, the face color is corrected using a predetermined color, or the like, based on the face detection result. This parameter also includes information to be used for, for example, automatic photo correction. For example, when performing automatic photo correction for static1.jpg, the automatic photo correction is performed for a still image obtained by resizing the short side of static1.jpg to several hundred to several thousand pixels when displaying the image in the preview display portion 418 of the application 80. This can speed up the automatic photo correction processing.

When the print system 12 generates print data, the print quality of the photo album can be improved by performing automatic photo correction for original static1.jpg. Since the print system 12 performs the automatic photo correction using the result of face detection performed for the resized still image included in the parameter, the automatic photo correction processing can be sped up. In addition, even if the OSs, on which the application 80 and the print system 12 are executed, are different, the difference of appearance for the user concerning the correction contents of the tint and photos can be reduced. More specifically, the difference of appearance for the user concerning the correction contents of the tint and photos can be reduced between the preview of the photo album displayed in the preview display portion 418 of the application 80 and the photo album printed and bound by the print system 12 and the printer 14.

As for the parameter information, a number temporarily assigned to each slot based on a rule defined by the application 80 itself, as shown in FIGS. 19A, 19B, and 19C, is used as part of the file name (a portion other than the extension). The layout data 2113 is formed from text data to be laid out in the slot 1904 of the front cover of the photo album of type-N. In the layout data 2113, 0001.dat is the text data to be laid out in the slot 1904. As for the text data, a number assigned based on the above-described rule, as shown in FIGS. 19A, 19B, and 19C, is used as part of the file name. That is, the correspondence between the still image to be laid out in the slot and image layout information and parameter information of image processing corresponding to the still image is indicated by using the same number in the file names.

The layout data 2114 to 2117 are formed from still images to be laid out in the slots 1913 to 1916 of page 1 of the body of the photo album of type-N, the layout methods of the still images, and information about image correction, respectively. The layout data 2118 to 2121 are formed from still images to be laid out in the slots 1917 to 1920 of page 2 of the body of the photo album of type-N, the layout methods of the still images, and information about image correction, respectively. The layout data 2122 and 2123 are formed from still images to be laid out in the slots 1933 and 1934 of page 3 and page 4 of the body of the photo album of type-N, the layout methods of the still images, and information about image correction, respectively. The layout data 2124 is formed from text data to be laid out in the slot 1935 of the front cover of the photo album of type-N. The layout data 2125 is formed from a still image to be laid out in the slot 1905 of the back cover of the photo album of type-N, the layout method of the still image, and information about image correction. The layout data 2126 is formed from text data to be laid out in the slot 1906 of the back cover of the photo album of type-N.

The still images, the layout methods of the still images, and the information about image correction in the layout data 2114 to 2123 and 2125 for the slots in which the still images are to be laid out are the same as those described concerning the layout data 2112, and a detailed description thereof will be omitted here. The text data in the layout data 2124 and 2126 for the slots 1905 and 1906 in which the text data are to be laid out are the same as that described concerning the layout data 2113, and a detailed description thereof will be omitted here.

In step S2203, the application 80 sends the album data 2110 to the management system 6. As shown in FIG. 21B, the album data 2110 includes the photo album information 2101 in which the numbers (template IDs) of layout templates and the arrangement order of the layout templates are described, and the layout data 2112 to 2126. The layout data 2112 to 2126 are formed from still images, image layout information, parameters for image correction and image processing, and text data. The management system 6 associates user's order-associated information sent from the shopping site 11 with the data of the photo album, for example, the album data 2110, and manages them as order information. The management system 6 also sends the order information including the data of the photo album and the order-associated information to the print system 12 in the server 7 (not shown).

In step S2204, the print system 12 obtains the numbers (template IDs) of layout templates and the arrangement order of the layout templates from the photo album information 2101 in the album data 2110. In addition, the print system 12 generates, from the layout data 2112 to 2126, photo album print data based on the still images, image layout information, parameters for image correction and image processing, and text data, which have file names with consecutive numbers. The processing procedure then ends. After the processing procedure ends, the print system 12 sends the generated print data to the printer 14. After that, the printer 14 receives the print data and prints the photo album.

As described above, according to this embodiment, the information amount of a photo album that the application 80 sends to the print system 12 via the management system 6 to generate print data can be decreased. As a result, since the time needed for data communication can be shortened, the waiting time of the user can be reduced, and excellent user operability can be attained. Additionally, since the load in data sending/receiving decreases, the cost of the server that executes the management system 6 or the print system 12 can be reduced.

In this embodiment, pieces of information about layout templates are stored in the application 80 and the print system 12 in advance. The application 80 changes the file names of still images and text data to be laid out in the slots, image layout information about the still images, and parameters for image correction and image processing based on the rule defined by the application 80 itself, and sends them to the print system 12. The print system 12 generates print data based on the files and the information about the layout templates stored in advance. With this arrangement, the algorithm used to generate print data is simplified, and control is simplified, too. It is, therefore, possible to scale down the program used to generate print data and to implement it by simple control.

In this embodiment, the management system 6 receives the data of a photo album sent from the application 80 and temporarily stores it. The management system 6 then associates user's order-associated information (a name, an address, a telephone number, a delivery destination etc.) sent from the shopping site 11 with the data of the photo album, and manages them as order information. The management system 6 also sends the order information including the data of the photo album and the order-associated information to the print system 12. However, the present invention is not limited to this example. For example, when the print system 12 has this function of the management system 6, the present invention can be implemented without the server (PC 5) of the management system 6.

Second Embodiment

In this embodiment, associated images are automatically extracted from a moving image and laid out.

Figure 18:
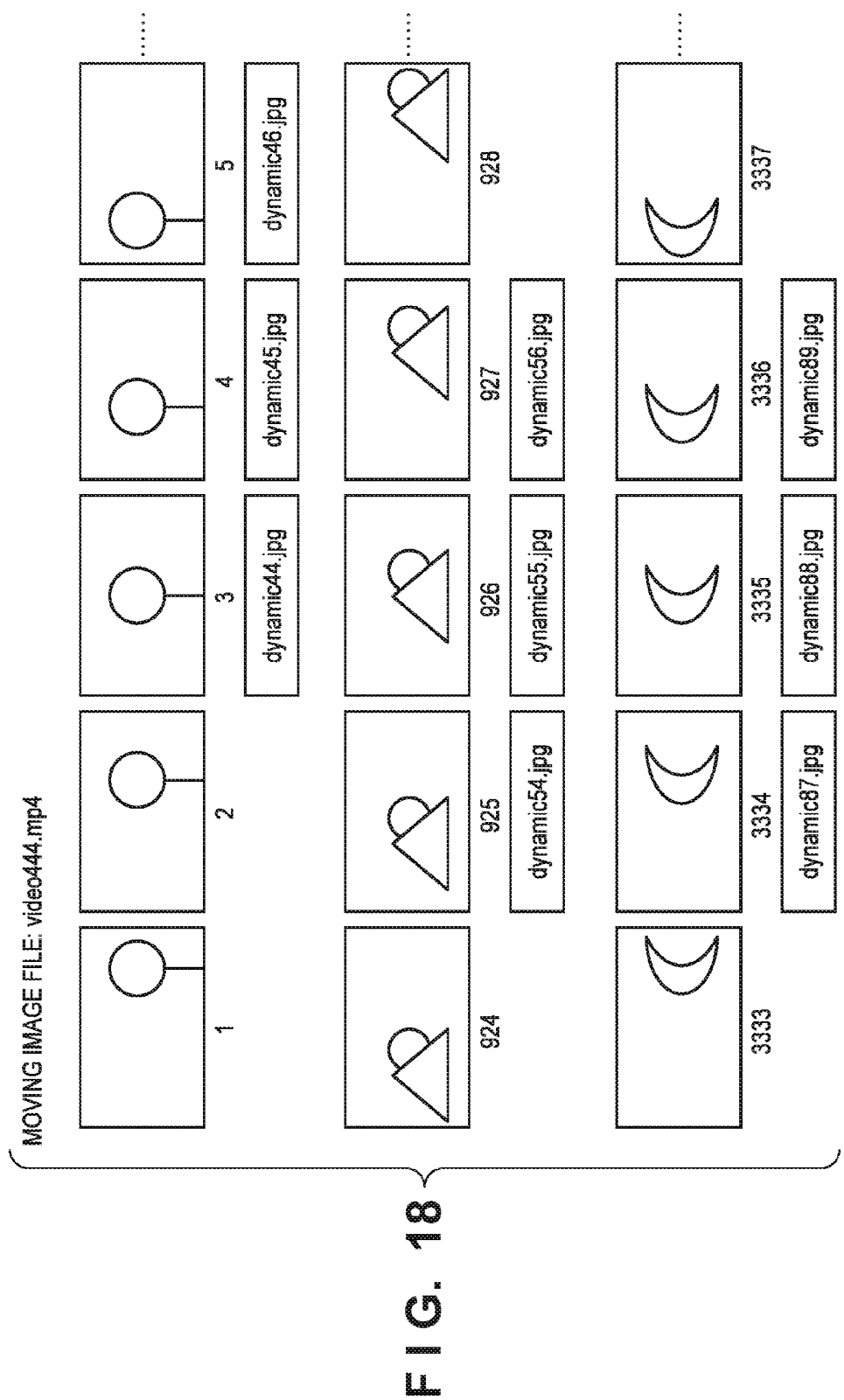
FIG. 18 is a view showing an example of frames that constitute a moving image.

FIG. 18 shows an example of frames that constitute a moving image. FIG. 18 shows an example of a moving image video444.mp4. Referring to FIG. 18, a number added under each frame is the frame number of the frame. Files dynamic44.jpg, dynamic45.jpg, and dynamic46.jpg are still image files extracted from frames 3, 4, and 5 of video444.mp4 and stored by an application 80. Files dynamic54.jpg, dynamic55.jpg, and dynamic56.jpg are still image files extracted from frames 925, 926, and 927 of video444.mp4 and stored by the application 80. Files dynamic87.jpg, dynamic88.jpg, and dynamic89.jpg are still image files extracted from frames 3334, 3335, and 3336 of video444.mp4 and stored by the application 80. As shown in FIG. 18, frames 1 to 5, frames 924 to 928, and frames 3333 to 3337 are frame groups of different scenes.

In this embodiment, for each scene, frame images are classified based on objects included in the frame images. For example, if the type of an object included in a still image is different, the scene is classified as a different scene. The scene classification may be done based on another criterion. For example, scenes may be classified based on the same or similar composition.

Figure 6:
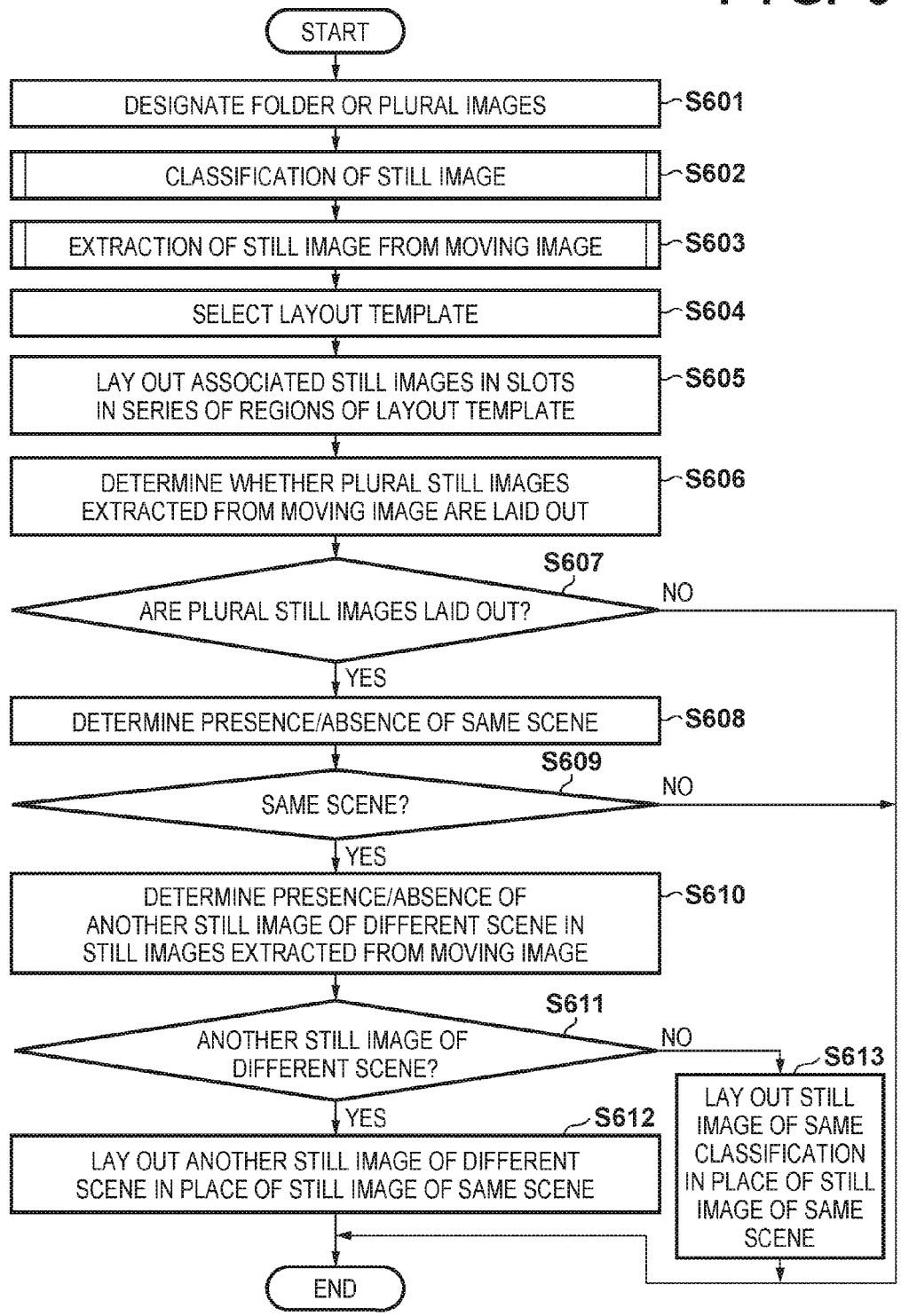
FIG. 6 is a flowchart showing automatic photo album creation processing.

FIG. 6 is a flowchart showing processing of automatically creating a photo album according to this embodiment. A program associated with the flowchart of FIG. 6 is stored in, for example, an HDD 202, read out to a RAM 201, and executed by a CPU 204. The user selects one of a time selection button 408, a scene selection button 409, and a theme selection button 410 shown in FIG. 4A, and presses a photo album creation button 412. According to the pressing, the application 80 executes the processing shown in FIG. 6.

In step S601, the application 80 selects a folder (not shown) in a PC 1 in which still images or moving images are stored or still images or moving images in the PC 1, and designates the storage location of an image group or an image group necessary when creating a photo album. Note that, in step S601, the user may be caused to select a folder in the PC 1 in which still images or moving images are stored or still images or moving images in the PC 1.

In step S602, the application 80 executes still image classification processing shown in FIG. 7. Details of the processing of this step will be described later.

In step S603, according to each of the classification methods (time base, scene base, and theme base) in the still image classification processing of step S602, the application 80 executes one of processes shown in FIGS. 8A to 8C corresponding to each method. The processes shown in FIGS. 8A to 8C are processes of extracting a still image (frame image) from a moving image in correspondence with the classification methods. Note that, as for the classification method, not only a case in which one of the time base, scene base, and theme base is applied, but also, a case in which some of them are combined, is included in the embodiment. Details of the processing of this step will be described later.

In step S604, based on the classification method applied in step S602, the application 80 selects a layout template associated with the classification method. For example, assume that the application 80 selects the theme base classification method in step S602. In this case, the application 80 selects a layout template associated with the theme base classification method in step S604. Here, the application 80 is assumed to select a layout template including a layout template 1140 shown in FIG. 11C.

In step S605, the application 80 lays out still images associated with each other in slots in a series of regions associated in the layout template. At this time, if the number of still images of the classification (for example, theme) is larger than a predetermined number of slots in the series of regions, scoring as described in the first embodiment may be performed, and the still images may be assigned to the predetermined number of slots in descending order of score.

In step S606, the application 80 confirms the still images laid out in the slots, and determines whether a plurality of frame images extracted from a moving image are laid out. Upon determining that a plurality of frame images are laid out (YES in step S607), the process advances to step S608. Upon determining that a plurality of frame images are not laid out (NO in step S607), the processing procedure ends. After the processing procedure ends, the application 80 displays an editing screen 415 shown in FIG. 4B.

Here, assume that, as shown in FIG. 13C, static14.jpg, static28.jpg, dynamic44.jpg, dynamic45.jpg, and dynamic46.jpg are laid out in slots 1143 to 1147.

In step S608, the application 80 determines whether the plurality of frame images extracted from the moving image and laid out include frame images of the same scene. Upon determining that frame images of the same scene are included (YES in step S609), the process advances to step S610. Upon determining that frame images of the same scene are not included (NO in step S609), the processing procedure ends. After the processing procedure ends, the application 80 displays the editing screen 415 shown in FIG. 4B.

In step S610, the application 80 determines whether a frame image of a scene different from the scenes determined to be the same scene exists in the frame images extracted from the moving image. Upon determining that a frame image of a different scene exists (YES in step S611), the process advances to step S612. Upon determining that a frame image of a different scene does not exist (NO in step S611), the process advances to step S613.

In step S612, the application 80 replaces one of the frame images of the same scene in the frame images extracted from the moving image and laid out in the slots with the frame image of the different scene extracted from the moving image, and lays out the frame image in the slot. As a result, in this example, dynamic45.jpg laid out in the slot 1146 is replaced with dynamic55.jpg. In addition, dynamic46.jpg laid out in the slot 1147 is replaced with dynamic88.jpg. As shown in FIG. 13D, static14.jpg, static28.jpg, dynamic44.jpg, dynamic55.jpg, and dynamic88.jpg are laid out in the slots 1143 to 1147, respectively. Then, the processing procedure ends. After the processing procedure ends, the application 80 displays the editing screen 415 shown in FIG. 4B.

In step S613, the application 80 replaces one of the frame images of the same scene in the frame images extracted from the moving image and laid out in the slots with a still image of the same classification, which is not a frame image extracted from the moving image, and lays out the still image in the slot. At this time, the replacement may be done such that the score value shown in FIG. 14 becomes large. Alternatively, the replacement may be done such that the point of one of the elements shown in FIG. 14 becomes large. This can improve the user satisfaction for a finally completed layout image. Then, the processing procedure ends. After the processing procedure ends, the application 80 displays the editing screen 415 shown in FIG. 4B.

(Still Image Classification Processing)

FIG. 7 is a flowchart showing still image classification processing. A program associated with the flowchart of FIG. 7 is stored in, for example, the HDD 202, read out to the RAM 201, and executed by the CPU 204. This processing corresponds to the process of step S602 in FIG. 6.

In step S701, the application 80 obtains the selection state of a moving image file processing method selection portion 406 by the user, and determines the classification method based on the processing method of extracting a still image from a moving image, which is selected by the user. Upon determining that the classification method is the time base classification method (YES in step S702), the process advances to step S703. Upon determining that the classification method is not the time base classification method (NO in step S702), the process advances to step S704.

In step S703, the application 80 refers to DateTime information in Exif information of a still image (JPEG file), and the creation date, updating date/time, access date/time, and the like, of the still image file, and classifies the still image based on a shooting date/time obtained from these pieces of information. The application 80 stores the classification information and the classification result (group) in association with the target still image. At this time, if DateTime information in Exif information does not exist, the application 80 stores a shooting date/time obtained from the creation date, updating date/time, access date/time, and the like, of the file in association with the still image.

As the classification method, for example, a method of classifying still images of the same day into the same group or a method of classifying still images of the same time information, for example, the same month into the same group is used. For example, static100.jpg, static102.jpg, static103.jpg, static106.jpg, and static109.jpg in FIG. 17B show this case. For static102.jpg, information representing that the still image is classified by Dec. 24, 2013, between 20:00 and 21:00 (from 20:00 to 20:59), is stored in association with Info (classification information).

Upon determining that the classification method is the scene base classification method (YES in step S704), the process advances to step S705. Upon determining that the classification method is not the scene base classification method (NO in step S704), the process advances to step S706.

In step S705, the application 80 analyzes the color information, histogram, and the like, of the still image, classifies the still image based on the analysis result, and stores the classification information and the classification result (group) in association with the target still image. At this time, the application 80 stores the color information and the histogram information as well in association with the still image. As the classification method, for example, a method of classifying still images of similar tints into the same group or a method of classifying still images whose RGB or YCrCb histograms match or which have close chromaticities within a predetermined threshold range into the same group is used. For example, static120.jpg, static121.jpg, static123.jpg, and static125.jpg in FIG. 17B show this case. For static120.jpg, information representing that the still image is classified by histogram4 (histogram4-* (* is a natural number), which is a histogram value determined as the group of histogram4), is stored in association with Info (classification information). After the process of this step, the processing procedure ends.

Upon determining that the classification method is the theme base classification method (YES in step S706), the process advances to step S707. Upon determining that the classification method is not the theme base classification method (NO in step S706), the process advances to step S708.

In step S707, the application 80 analyzes an object included the file selected by the user using a file selection button 411, and classifies the still image based on the analysis result. The application 80 stores the classification information and the classification result (group) in association with the target still image. At this time, the application 80 stores the object information as well in association with the still image. As for examples of the object, there are various kinds of objects such as a person, an animal including a dog and a cat, a flower, a train, a vehicle, and a motorcycle, and the object is not particularly limited. Note that, as the person as an example of the object, a person, a face, or the like, may be discriminated. For example, static155.jpg, static156.jpg, static157.jpg, and static160.jpg in FIG. 17B show this case. For static155.jpg, information representing that the still image is classified by object8 (object8-* (* is a natural number), which is information defining an object determined as the group of object8), is stored in association with Info (classification information). After the process of this step, the processing procedure ends.

In step S708, the application 80 classifies the still image based on another method (a method other than the time, scene, and theme), and stores the result in association with the target still image. At this time, the application 80 stores the information of the other method as well in association with the still image. Note that, when the user operates a main screen 401 of this embodiment, the application 80 does not execute the process of step S708 in some cases. After the process of this step, the processing procedure ends.

(Still Image Extraction Processing)

FIGS. 8A to 8C are flowcharts showing processing of extracting a still image from a moving image. Programs associated with the flowcharts of FIGS. 8A to 8C are stored in, for example, the HDD 202, read out to the RAM 201, and executed by the CPU 204. The three processing procedures shown in FIGS. 8A to 8C correspond to the process of step S603 in FIG. 6. FIG. 8A is a flowchart showing processing of extracting a still image (frame image) from a moving image on the time base. FIG. 8B is a flowchart showing processing of extracting a still image (frame image) from a moving image on the scene base. FIG. 8C is a flowchart showing processing of extracting a still image (frame image) from a moving image on the theme base.

Assume that the user selects the time selection button 408 shown in FIG. 4A and presses the photo album creation button 412. In this case, when the application 80 executes the processing of extracting a still image from a moving image in step S603 of FIG. 6, the application 80 starts the still image extraction processing shown in FIG. 8A.

In step S811, based on classification information associated with a still image in step S703 and DateTime information in Exif information of the still image or a shooting date/time associated with the still image, the application 80 extracts an associated frame from a moving image. At this time, first, the application 80 obtains the shooting date/time of a moving image and, using classification information (for example, the same day or same month) associated with the still image obtained in step S703, specifies a moving image with a coincident classification. The application 80 associates the classification information with the specified moving image and stores the information. Next, the application 80 obtains, from a frame still image of the same classification, DateTime information in Exif information or a shooting date/time associated with the frame image, and extracts a frame with a coincident shooting date/time from the moving image of the same classification. At this time, the application 80 analyzes all frames included in a predetermined range of a predetermined time (for example, a total of 6 sec including 3 sec before and 3 sec after) before and after the shooting date/time serving as a reference time, and extracts a more adequate frame for a photo album.

The application 80 may extract a plurality of frames. At this time, to extract a more adequate frame, the application 80 performs scoring of the frame images using the elements shown in FIG. 14 and employs a frame in descending order of original score (Original). As for the number of frames to be employed, for example, the number of slots in which it is possible to lay out frame images extracted from a moving image may be decided as the number of frames to be employed.

In step S812, the application 80 stores the frame extracted in step S811 as a still image. Note that, if a frame with a coincident shooting date/time does not exist in step S811, the application 80 executes processing shown in FIG. 16A for the moving image and extracts a still image.

In step S813, the application 80 associates the frame image extracted from the moving image with the classification information, the classification result, and an associated file, and stores the information. For example, dynamic301.jpg and dynamic302.jpg in FIG. 17B show this case. For dynamic301.jpg, information representing that the still image is classified by Dec. 24, 2013, between 20:00 and 21:00 (from 20:00 to 20:59), is stored in association with Info (classification information). In addition, group information dateTime1 is stored in association with Group (classification result). Also, static102.jpg is stored in association with Related File (associated file). After that, the processing procedure ends.

Assume that the user selects the scene selection button 409 shown in FIG. 4A and presses the photo album creation button 412. In this case, when the application 80 executes the processing of extracting a still image from a moving image in step S603 of FIG. 6, the application 80 starts the still image extraction processing shown in FIG. 8B.

In step S821, based on classification information such as color information or a histogram associated with a still image in step S705 of FIG. 7, the application 80 extracts an associated frame from a moving image. At this time, the application 80 extracts a frame from each moving image, analyzes the color information or the histogram of the frame, and compares it with the classification information (the color or the histogram) associated with the still image obtained in step S705 of FIG. 7. If they are coincident or similar as the result of comparison, the application 80 associates the classification information with the moving image and stores the information. The application 80 also associates the classification information with the frame with coincident classification information and stores the information. The application 80 analyzes all frames with coincident classification information, and extracts an adequate frame for a photo album. The application 80 may extract a plurality of frames. Extraction of an adequate frame (the score order and the number of frames to be employed) is performed based on the same criterion as in FIG. 8A.

In step S822, the application 80 stores the frame extracted in step S821 as a still image (frame image).

In step S823, the application 80 associates the frame image extracted from the moving image with the classification information, the classification result, and an associated file, and stores the information. For example, the row of dynamic321.jpg in FIG. 17B shows this case. For this image, information representing that the still image is classified by histogram4 (histogram4-* (* is a natural number), which is a histogram value determined as the group of histogram4), is stored in association with Info (classification information). In addition, group information histogram4 is stored in association with Group (classification result). Also, for this image, static120.jpg is stored in association with Related File (associated file). After that, the processing procedure ends.

Assume that the user selects the theme selection button 410 shown in FIG. 4A and presses the photo album creation button 412. In this case, when the application 80 executes the processing of extracting a still image from a moving image in step S603 of FIG. 6, the application 80 starts the still image extraction processing shown in FIG. 8C.

In step S831, based on the classification information of an object associated with a still image in step S707 of FIG. 7, the application 80 extracts an associated frame from a moving image. At this time, the application 80 extracts a frame from each moving image, analyzes an object included in the frame, and compares it with the classification information (object) associated with the still image obtained in step S707 of FIG. 7. If they are coincident or similar as the result of the comparison, the application 80 associates the classification information with the moving image and stores the information. The application 80 also associates the classification information with the frame with coincident classification information and stores the information. The application 80 analyzes all frames with coincident classification information, and extracts an adequate frame for a photo album. The application 80 may extract a plurality of frames. Extraction of an adequate frame (the score order and the number of frames to be employed) is performed based on the same criterion as in the embodiment shown in FIG. 8A.

In step S832, the application 80 stores the frame extracted in step S831 as a still image.

In step S833, the application 80 associates the still image extracted from the moving image with the classification information, the classification result, and an associated file, and stores the information. For example, the row of dynamic341.jpg in FIG. 17B shows this case. For this image, information representing that the still image is classified by object8 (object8-* (* is a natural number), which is information defining an object determined as the group of object8), is stored in association with Info (classification information). In addition, group information object8 is stored in association with Group (classification result). Also, for this image, static155.jpg is stored in association with Related File (associated file). After that, the processing procedure ends.

As described above, in this embodiment, based on a classified still image, a still image (frame image) associated with the still image is automatically extracted from a moving image, and the still images are laid out in a series of regions in a layout. It is, therefore, possible to automatically extract an adequate associated image from a moving image, and to lay it out without any cumbersome operation of the user. In addition, a plurality of still images of different scenes are extracted from one moving image and laid out in a series of regions, thereby automatically extracting a variety of images and laying them out without any cumbersome operation of the user.

Third Embodiment

In this embodiment, a still image having a high resolution is laid out in a slot of a larger size out of the slots of a template, thereby automatically attaining a realistic image layout having both the advantage of a still image and the motion of a moving image.

FIG. 9 is a flowchart showing processing of automatically creating a photo album according to this embodiment. A program associated with the flowchart of FIG. 9 is stored in, for example, an HDD 202, read out to a RAM 201, and executed by a CPU 204. The user selects one of a time selection button 408, a scene selection button 409, and a theme selection button 410 shown in FIG. 4A, and presses a photo album creation button 412. According to the pressing, an application 80 executes the processing shown in FIG. 9. In this embodiment, a description will be made using data shown in FIG. 13E.

In step S901, the application 80 selects a folder (not shown) in a PC 1 in which still images or moving images are stored, or still images or moving images in the PC 1, and designates the storage location of an image group or an image group necessary when creating a photo album. Note that, in step S901, the user may be caused to select a folder in the PC 1 in which still images or moving images are stored or still images or moving images in the PC 1.

In step S902, the application 80 executes still image classification processing shown in FIG. 7 described in the second embodiment. Here, static11.jpg and static12.jpg are assumed to be photos (still images) shot by a digital still camera and stored. Classification information associated with static11.jpg and classification information associated with static12.jpg shown in FIG. 13E are assumed to match.

In step S903, according to each of the classification methods (time base, scene base, and theme base) in the still image classification processing of step S902, the application 80 executes one of processes shown in FIGS. 8A to 8C corresponding to each method. The processes shown in FIGS. 8A to 8C are processes of extracting a still image (frame image) from a moving image, as described in the second embodiment. Note that, as for the classification method, not only a case in which one of the time base, scene base, and theme base is applied, but also, a case in which some of them are combined, is included in the embodiment. Assume that dynamic22.jpg, dynamic43.jpg, dynamic50.jpg, dynamic78.jpg, and dynamic85.jpg shown in FIG. 13E are still images extracted from one moving image. All pieces of classification information associated with the frame images are assumed to match with each other and also match with the classification information associated with static11.jpg and the classification information associated with static12.jpg.

In step S904, based on the classification method applied in step S902, the application 80 selects a layout template associated with the classification method. Assume that the application 80 selects the scene base classification method in step S902. In this case, the application 80 selects a layout template associated with the scene base classification method in step S904. Here, the application 80 is assumed to select a layout template including a layout template 1200 shown in FIG. 12A.

In step S905, the application 80 lays out normal still images associated with each other in slots suitable for normal still images (still images that are not frame images extracted from a moving image) in a series of regions associated in the layout template. Here, the normal still images static11.jpg and static12.jpg associated with each other are laid out in slots 1203 and 1204, respectively. At this time, if the number of classified still images is greater than a predetermined number of slots in the series of regions, scoring as described in the first embodiment may be performed, and the still images may be assigned to the predetermined number of slots in descending order of score.

In step S906, the application 80 lays out frame images extracted from a moving image and associated with each other in slots suitable for frame images extracted from a moving image in the series of regions associated in the layout template. Here, the still images dynamic22.jpg, dynamic43 jpg, dynamic50.jpg, dynamic78.jpg, and dynamic85.jpg extracted from a moving image and associated with each other are laid out in slots 1205 to 1209, respectively. After that, the processing procedure ends. After the processing procedure ends, the application 80 displays an editing screen 415 shown in FIG. 4B.

As described above, in this embodiment, still images having a high resolution are laid out in the relatively large slots 1203 and 1204 suitable for normal still images in the series of regions associated in the layout template. In addition, still images extracted from one moving image are laid out in the series of slots for frame images, that is, the series of slots 1205 to 1209. It is, therefore, possible to provide a photo album creator application that automatically attains a realistic image layout having both the advantage of a still image and the motion of a moving image without any cumbersome operation of the user. When a plurality of frame images extracted from one moving image are continuously laid out in this way, a layout image that expresses a motion can be generated.

Fourth Embodiment

This embodiment improves user operability in a case in which a user makes an additional order of a photo album of a shape (size), color or pattern, paper type, binding, or cover different from that of an ordered photo album, or changes a photo album to a compatible photo album while keeping the layout of photos unchanged.

FIG. 4C shows an example of a photo album order screen displayed on a web browser 143 on the client side. In an order screen 422, a photo album type selection portion 425 displays a choice of a compatible photo album of a shape (size), paper type, binding, or cover different from that of an ordered photo album. Note that the photo album type selection portion 425 displays choices of a plurality of types by, for example, a pull-down. That is, templates that are compatible in the shopping site are selectably presented. Hence, the user can easily generate a compatible photo album by selecting a photo album from the choices displayed in the photo album type selection portion 425.

For example, when the user is going to order a photo album of type-N, photo albums of type-N large, type-S, type-T, and type-U compatible with type-N are displayed as choices in the photo album type selection portion 425. When the user selects a photo album of type-N large in the photo album type selection portion 425, and presses an addition button 426, the photo album of type-N large selected in the photo album type selection portion 425 can be added to a shopping cart (not shown). Accordingly, the user can put two photo albums of, for example, type-N and type-N large in the shopping cart and simultaneously order them. That is, it is possible to simultaneously order the photo albums of two types without causing an application 80 to regenerate a layout image and to resend template IDs and the arrangement order of them, or images and texts to the server.

Also, for example, when the user is going to order a photo album of type-N, photo albums of type-N large, type-S, type-T, and type-U compatible with type-N are displayed as choices in the photo album type selection portion 425. When the user selects a photo album of type-T in the photo album type selection portion 425, and presses a change button 427, the photo album of type-N in the shopping cart is deleted from the shopping cart. In addition, the photo album of type-T selected in the photo album type selection portion 425 is added to the shopping cart. The type of the photo album to be ordered can thus be changed from type-N to type-T. That is, it is possible to change a photo album to a photo album of another type and order it without causing the application 80 to regenerate a layout image and to resend template IDs and the arrangement order of them, or images and texts to the server.

In the fourth embodiment, as layout templates, a plurality of compatible layout templates are provided such that a photo album of a shape (size), color or pattern, paper type, binding, or cover different from that of a photo album already selected by the user for an order can be ordered. These templates are prepared as data including vector information for designating the outer shape and position of a photo album and the shape and position of each slot, layer information representing how the templates or slots are overlaid, color information such as a background color, and image information such as a background pattern. For a compatible template, information about the compatibility is held. As the information about a layout template, pieces of information of the same contents are stored in advance in the application 80 on the client side and a print system 12 on the server side. As a result, information about a layout template with a large information (data) amount need not be sent from the application 80 to a management system 6 or the print system 12 via the Internet. It is, therefore, possible to decrease the information amount of the data of a photo album to be sent from the application 80 to the print system 12 via the management system 6 to generate print data. In addition, since the time needed for data communication can be shortened, the waiting time of the user can be reduced, and excellent user operability can be attained. Furthermore, since the load in data sending/receiving decreases, the cost of the server that executes the management system 6 or the print system 12 can be reduced.

Note that, when providing an order of a compatible photo album as described above to the user as a special option or function that enables the order only in a shopping site 11, information about layout templates is stored in the print system 12 in advance. In this case, the same information need not always be stored in the application 80 in advance. However, to enable the order of a compatible photo album as a function of the application 80, the same information about layout templates is stored in the application 80 and the print system 12 in advance. The shopping site 11 may hold information about the compatibility of a template or may be able to refer to the information from the management system 6 or the print system 12.

FIG. 22B is a flowchart showing an example of processing of generating photo album print data according to this embodiment. For example, when the user is going to order a photo album of type-N, photo albums of type-N large, type-S, type-T, and type-U compatible with type-N are displayed as choices in the photo album type selection portion 425. In this case, when the user selects a photo album of type-N large in the photo album type selection portion 425, and presses the addition button 426, the addition processing shown in FIG. 22B starts. Alternatively, when the user selects a photo album of type-T in the photo album type selection portion 425, and presses the change button 427, the change processing shown in FIG. 22B starts.

In step S2211, the shopping site 11 accepts an additional order of a photo album of another type or a change order to change a photo album to another type. For example, upon accepting a change order to a photo album of type-T in step S2211, the shopping site 11 deletes a photo album of type-N in the shopping cart from the shopping cart, and adds a photo album of type-T to the shopping cart. The shopping site 11 changes the type of the photo album to be ordered from type-N to type-T.

Upon accepting, for example, an order of type-N and an additional order of type-N large in step S2211, in step S2212, the shopping site 11 adds information representing that photo albums of type-N and type-N large are ordered to order-associated information, and sends the order-associated information to the management system 6. On the other hand, upon accepting, for example, a change order from type-N to type-T in step S2211, in step S2212, the shopping site 11 adds information representing that a photo album of type-N is deleted (canceled), and an additional order (change order) of a photo album of type-N large is made to order-associated information. The shopping site 11 then sends the order-associated information to the management system 6. The order-associated information here includes a name, an address, a telephone number, and a delivery destination.

As shown in FIG. 21B, album data 2110 includes photo album information 2101 in which the numbers (template IDs) of layout templates and the arrangement order of the layout templates are described, and layout data 2112 to 2126. The layout data 2112 to 2126 are formed from still images, image layout information, parameters for image correction and image processing, and text data. The management system 6 associates the user's order-associated information sent from the shopping site 11 with the data of the photo album, for example, the album data 2110, and manages them as order information. The management system 6 also sends the order information including the data of the photo album and the order-associated information to the print system 12 (not shown).

In step S2213, the print system 12 in a server 7 generates photo album print data corresponding to the addition of another type or the type change. More specifically, the print system 12 obtains the numbers (template IDs) of layout templates and the arrangement order of the layout templates from the photo album information 2101 in the album data 2110. In addition, the print system 12 generates, from the layout data 2112 to 2126, photo album print data based on the still images, image layout information, parameters for image correction and image processing, and text data, which have file names with consecutive numbers. At this time, the print system 12 generates photo album print data corresponding to the addition of another size or the size change in accordance with the information of the additional order or change order included in the order-associated information. The processing procedure then ends. After the processing procedure ends, the print system 12 sends the generated print data to a printer 14. After that, the printer 14 receives the print data and prints the photo album.

Note that, as a method of adding or changing a photo album type in step S2213, for example, the following method is used.

[Method 1]

Using a layout template for an added/changed photo album, images are laid out in the layout template, thereby generating print data.

[Method 2]

A layout template for an original photo album added to the shopping cart first is resized, and images are laid out in the layout template, thereby generating print data of an added/changed photo album.

According to the fourth embodiment, when additionally ordering a compatible photo album or changing a photo album to a compatible photo album without changing the layout of photos, processing need not be re-executed from the step of automatically creating a photo album using the application 80. Since the user can make an additional order or a change only by selecting a photo album in the photo album type selection portion 425 of the order screen 422 and pressing the addition button 426 or the change button 427, excellent user operability can be attained.

In this embodiment, as layout templates, a plurality of compatible layout templates are prepared such that a photo album of a shape (size), color or pattern, paper type, binding, or cover different from that of a photo album ordered by the user can be ordered. An example in which, as the information about the layout templates, pieces of information of the same contents are stored in advance in the application 80 on the client side and the print system 12 on the server side has been described. For example, even if a compatible template is not provided, a layout template for the type of a photo album selected by the user first may be enlarged or reduced. The user can thus additionally order a photo album of a type of a different size or make a change order.

Fifth Embodiment

In this embodiment, color management in a print data generation system according to the present invention will be described.

Figure 23:
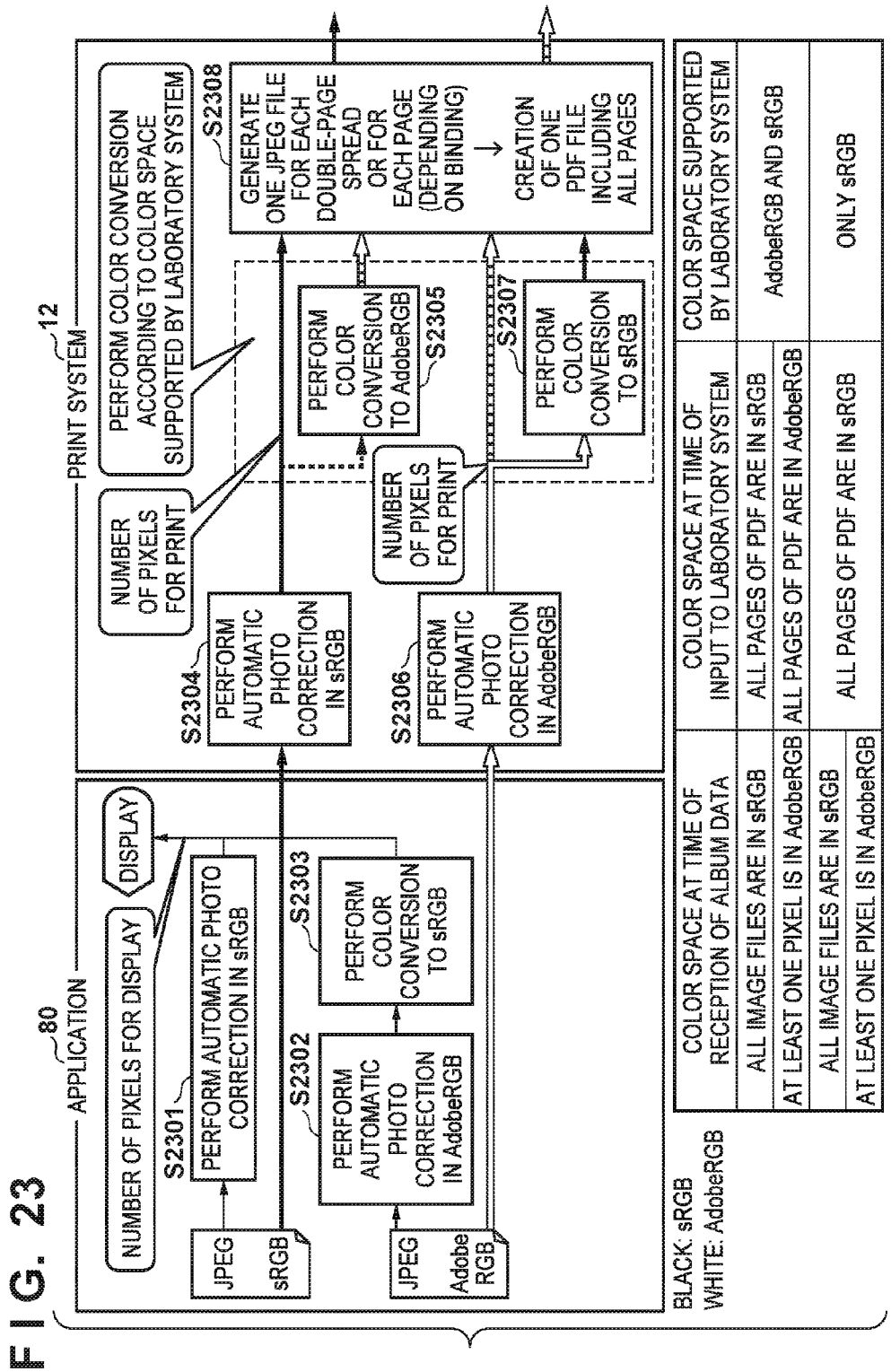
FIG. 23 is a sequence chart showing a data flow concerning automatic photo correction and color management.

FIG. 23 shows a data flow concerning automatic photo correction and color management according to the present invention. An example of a JPEG file will be described here as an example of a still image included in the data of a photo album (for example, album data 2110). The JPEG file can designate a color space. Hence, sRGB and AdobeRGB will be exemplified here.

In a case of a still image (JPEG file) having the sRGB color space, in step S2301, an application 80 performs automatic photo correction in the sRGB color space, and displays the preview of the photo album in a preview display portion 418. On the other hand, the application 80 sends the data of the photo album (for example, album data 2110) including the still image (JPEG file) having the sRGB color space to a print system 12 via a management system 6 without performing automatic photo correction. The print system 12 receives the data of the photo album (for example, album data 2110) including the still image having the sRGB color space. That is, the data of the photo album received by the print system 12 has not undergone automatic photo correction.

In step S2304, the print system 12 performs automatic photo correction in the sRGB color space for the still image (JPEG file) having the sRGB color space, and performs color conversion according to a color space supported by a laboratory system (not shown). For example, if the laboratory system (not shown) supports the sRGB color space, the print system 12 performs color conversion in the sRGB color space. On the other hand, if the laboratory system supports the AdobeRGB color space, the print system 12 performs color conversion in the AdobeRGB color space in step S2305.

In step S2308, the print system 12 generates a JPEG file for each double-page spread (every two pages) or for each page of the photo album. After generating all pages of the photo album, the print system 12 creates one PDF file as the photo album.

On the other hand, in a case of a still image (JPEG file) having the AdobeRGB color space, in step S2302, the application 80 performs automatic photo correction in the AdobeRGB color space.

In step S2303, the application 80 performs color conversion to sRGB, and displays the preview of the photo album in the preview display portion 418. On the other hand, the application 80 sends the data of the photo album (for example, album data 2110), including the still image (JPEG file) having the AdobeRGB color space to the print system 12, via the management system 6 without performing automatic photo correction or color conversion. The print system 12 receives the data of the photo album (for example, album data 2110) including the still image having the AdobeRGB color space. That is, the data of the photo album received by the print system 12 has undergone neither automatic photo correction nor color conversion.

In step S2306, the print system 12 performs automatic photo correction in the AdobeRGB color space for the still image (JPEG file) having the AdobeRGB color space, and performs color conversion according to a color space supported by the laboratory system (not shown). For example, if the laboratory system (not shown) supports the AdobeRGB color space, the print system 12 performs color conversion in the AdobeRGB color space. On the other hand, if the laboratory system supports the sRGB color space, the print system 12 performs color conversion in the sRGB color space in step S2307. After that, the process of step S2308 is performed, as described above.

In this embodiment, when automatically creating a photo album using a still image having an arbitrary color space, the preview of the photo album displayed in the preview display portion 418 of the application 80 and the photo album printed and bound by the print system 12 and a printer 14 can have the same appearance for the user concerning the correction contents of the tint and photos. It is, therefore, possible to create a high-quality photo album as imagined by the user.

Other Embodiments

In the above-described embodiments, the photo album creator application 80 as shown in FIGS. 4A to 4C has been exemplified as an example of an application. However, the present invention is not limited to this, and can be implemented by an arbitrary application having the same image extraction function.

In the above-described embodiments, the information processing apparatus is assumed to be a personal computer. However, an arbitrary information processing apparatus (terminal) usable in the same way such as a portable telephone, a portable information terminal, a digital still camera, a digital video camera, a portable music player, a game machine, a set-top box, or an Internet appliance may be used.

In the above-described embodiments, an operating system (OS) equivalent to Windows® 8 is used as an example of an OS. However, the OS is not limited to this, and an arbitrary OS can be used. In the above-described embodiments, Ethernet® is used as a configuration example of the network 4. The network configuration is not, however, limited to this example, and any other arbitrary network configuration, for example, a wireless LAN, IEEE1394, or Bluetooth® may be used.

As described above, according to the first embodiment, it is possible to provide a photo album creator application that handles both still images and moving images together, automatically extracts a more adequate image, and lays it out without any cumbersome operation of the user.

In the second embodiment, based on a classified still image, a frame image associated with the still image is automatically extracted from a moving image, and the still images are laid out in a series of regions. It is, therefore, possible to provide a photo album creator application that automatically extracts an adequate associated image and lays it out without any cumbersome operation of the user. It is also possible to provide a photo album creator application that extracts a plurality of frame images of different scenes from one moving image and lays them out in a series of regions, thereby automatically extracting a variety of images and laying them out without any cumbersome operation of the user.

In the third embodiment, an adequate image is laid out, in a layout template, in each of slots suitable for still images such as photos shot by a digital still camera and stored, and slots suitable for frame images extracted from a moving image. It is, therefore, possible to provide a photo album creator application that automatically attains a realistic image layout having both the advantage of a still image and the motion of a moving image without any cumbersome operation of the user.

As the still image classification method and the processing method of extracting a still image from a moving image, examples using a shooting date/time, a color or histogram, and an object have been described. However, the present invention is not limited to these examples, and can be implemented using an arbitrary processing method capable of achieving the same object. A still image may be classified, or a still image may be extracted from a moving image by combining a shooting date/time, a color or histogram, an object, and another processing method. When a plurality of processing methods are combined, the degree of completion of a photo album can be improved.

As the image analysis method, examples using elements of Color (color), Contrast (contrast), Brightness (brightness), Focus (focus), and Composition (composition) have been described. However, the present invention is not limited to these examples, and can be implemented using an arbitrary analysis method capable of achieving the same object.

In the above embodiments, an example has been described in which the application 80 sends a still image to the print system 12 via the management system 6 without processing the still image, and the print system 12 trims and lays out the still image in accordance with the shape of each slot or the layout position of the still image. However, for example, the application 80 may apply trimming processing to a still image to be laid out in each slot in accordance with the shape of each slot or the layout position of the still image and send the trimmed still image to the print system 12 via the management system 6. In this case, the application 80 need not send trimming information or image layout position information for each slot to the print system 12 via the management system 6. As a result, the information amount of the data of a photo album sent from the application 80 can be decreased, and the time needed for data communication can be shortened. The waiting time of the user can thus be reduced, and excellent user operability can be attained. Furthermore, since the load in data sending/receiving decreases, the cost of the server that executes the management system 6 or the print system 12 can be reduced.

Also, for example, when sending a trimmed still image to the print system 12 via the management system 6, the application 80 generates a still image by converting a high-resolution still image into a lower-resolution still image in accordance with the performance of the printer 14. Accordingly, the information amount of the data of a photo album can further be decreased, and the time needed for data communication can largely be shortened. The waiting time of the user can thus largely be reduced, and excellent user operability can be attained. Furthermore, since the load in data sending/receiving decreases, the cost of the server that executes the management system 6 or the print system 12 can largely be reduced.

Resolution conversion can be performed in accordance with the shape or size of a slot. For example, a still image to be laid out in a large slot is converted into 1,200 dpi, a still image to be laid out in a medium slot is converted into 600 dpi, and a still image to be laid out in a small slot is converted into 300 dpi. A still image whose resolution is converted in conformity with each slot is thus generated. As a result, adequate print quality can be maintained while decreasing the data communication amount. The print quality of a photo album can thus be kept high, and excellent user operability can be attained.

The data of a photo album sent from the application 80 to the management system 6 is put in, for example, one ZIP file (first ZIP file) formed by compressing the album data 2110. In addition, order-associated information that the management system 6 receives from the shopping site and the ZIP file (first ZIP file) of the data of the photo album are compressed together to form one ZIP file (second ZIP file). The management system 6 sends the second ZIP file to the print system 12.

The application 80 divides the first ZIP file into a plurality of files each having a size of, for example, about 50 MB, and sends the divided files to the management system 6. The size of each divided file of the first ZIP file is set to, for example, about 50 MB. If the size of the divided file is large, a progress bar displayed by the application 80 to indicate that data sending is ongoing may show a slow progress, or a response to a user operation of canceling data sending halfway may be slow. On the other hand, if the size of the divided file is small, the number of divided files increases. For this reason, the number of requests to the management system 6 increases, resulting in an increase in the communication load and an increase in the cost of the server. Hence, when the size of the divided file is set to an adequate size, the communication load can be reduced while suppressing lowering of user operability.

The management system 6 divides the second ZIP file into a plurality of files each having a size of, for example, about 100 MB, and sends the divided files to the print system 12. The size of each divided file of the second ZIP file is set to, for example, about 100 MB. When the size of the divided file is small, the risk of retry caused by a communication error decreases. On the other hand, when the size of the divided file is large, the number of divided files decreases. For this reason, the number of requests to the print system 12 decreases, resulting in a decrease in the communication load of the server and a decrease in the cost of the server. Hence, when the size of the divided file is set to an adequate size, the communication load of the server can be reduced while reducing the risk of a communication error.

The embodiments have been described above in detail. However, the present invention is not limited to these specific embodiments, and various changes and modification can be made without departing from the scope of the present invention.

According to the embodiments of the present invention, the following effects can be obtained.

(1) Since the information amount of the data of a photo album can be decreased, and the time needed for data communication can be shortened, the waiting time of the user can be reduced, and excellent user operability can be attained.

(2) Since the algorithm used to generate print data is simplified, and control is simplified, too, the program used to generate print data can be scaled down and implemented by simple control.

(3) Since the load in data sending/receiving decreases, the cost of the server can be reduced.

(4) The print quality of a photo album can be kept high, and excellent user operability can be attained.

(5) When additionally ordering a compatible photo album or changing a photo album to a compatible photo album without changing the layout of photos, processing need not be re-executed from the step of automatically creating a photo album using the application. Since the user can make an additional order or a change only by selecting a photo album in the photo album type selection portion of the order screen and pressing the addition button or the change button, excellent user operability can be attained.

(6) When automatically creating a photo album using a still image having an arbitrary color space, the preview of the photo album displayed in the preview display portion of the application and the printed and bound photo album can have the same appearance for the user. Here, the appearance for the user is, for example, the appearance concerning the correction contents of the tint and photos. It is, therefore, possible to create a high-quality photo album as imagined by the user.

Embodiment(s) of the present invention can also be realized by a computer of a system or an apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing system comprising:

(A) a first information processing apparatus comprising:
at least one processor and at least one memory storing an application that includes a plurality of templates and identification information assigned to each template, and the application, when executed by the at least one processor of the first information processing apparatus, causes the first information processing apparatus:

(i) to acquire a plurality of images;

(ii) to lay out one of the acquired plurality of images in one slot of one of the plurality of templates stored in the first information processing apparatus to generate a plurality of layout images, wherein the generated layout images are arranged in an arrangement order;

(iii) to cause a display unit to display the generated layout images;

(iv) to generate layout information in which the pieces of identification information respectively assigned to the plurality of templates used in the generated layout images are described in the arrangement order, wherein the layout information does not include any templates themselves;

(v) to generate a data set in which layout data includes the images used for generating the layout images and stored using file names with consecutive numbers, wherein the data set does not include any template themselves; and (vi) to send the generated layout information and the generated data set, wherein no templates themselves are sent with the generated layout information and the generated data set, and (B) a second information apparatus comprising:

at least one processor and at least one memory storing computer code that, when executed by the at least one processor of the second information processing apparatus, causes the second information processing apparatus;

(i) to obtain the generated layout information and the generated data set sent from the first information processing apparatus; and (ii) to generate a layout image using the acquired layout information, the acquired data set, and the plurality of templates stored in the second information processing apparatus.

2. The system according to claim 1, wherein the second information processing apparatus specifies a template to be used to generate the layout image and the arrangement order of the template based on the layout information sent by the first information processing apparatus, and lays out the layout data included in the data set sent by the first information processing apparatus in each slot of the specified template based on the file name, thereby generating the layout image.

3. The system according to claim 1, wherein the layout data further includes text data.

4. The system according to claim 2, wherein the data set further includes at least one of layout information of the image in a slot and parameter information of image processing for the image, and the first information processing apparatus assigns a file name corresponding to a name assigned to the corresponding layout data to each of the layout information and the parameter information.

5. The system according to claim 4, wherein the processor of the first information processing apparatus further causes the first information processing apparatus, by executing the computer code, to perform image processing for the image data, and instead of sending the parameter information, the first information processing apparatus sends, as the layout data, the image data that has undergone the image processing.

6. The system according to claim 5, wherein the image processing is one of trimming and resolution conversion.

7. The system according to claim 1, wherein the plurality of templates stored in the first information processing apparatus is not obtained when laying out the plurality of images.

8. The system according to claim 1, wherein the first information processing apparatus (i) further obtains information about compatibility between the plurality of templates, and (ii) can accept change to another template compatible with an template used when generating the data set based on the information about compatibility, and, if the first information processing apparatus accepts the change to the other template after sending the generated layout information and the generated data set, the first information processing apparatus sends information indicating identification number of the another template without re-sending the generated data set.

9. The system according to claim 4, wherein, in the generated data set, the layout data and the layout information and parameter information corresponding to the layout data are assigned with file names so that parts other than an extension of the file names are common, and the name assigned to the layout data is determined based on a rule defined by the first information processing apparatus.

10. An information processing apparatus capable of communicating with an external apparatus, the information processing apparatus comprising:

at least one processor and at least one memory storing an application that includes a plurality of templates and identification information assigned to each template, and the application, when executed by the at least one processor, causes the information processing apparatus:

(i) to acquire a plurality of images;

(ii) to lay out one of the acquired plurality of images in one slot of one of the plurality of templates stored in the information processing apparatus to generate a plurality of layout images, wherein the generated images are arranged in an arrangement order;

(iii) to cause a display unit to display the generated layout images;

(iv) to generate layout information in which the pieces of identification information respectively assigned to the plurality of templates used in the generated layout images are described in the arrangement order, wherein the layout information does not include any templates themselves;

(v) to generate a data set in which layout data includes the images used for generating the layout images stored with using file names with consecutive numbers, wherein the data set does not include any templates themselves; and (vi) to send the generated layout information and the generated data set, wherein no templates themselves are sent with the generated layout information and the generated data set;

wherein the generated layout information sent and the generated data set sent from the information processing apparatus are used by the external apparatus, with a plurality of templates stored in the external apparatus, for generating a layout image.

11. The information processing apparatus according to claim 10, wherein the layout data is one of image data and text data.

12. The information processing apparatus according to claim 10, wherein the external apparatus specifies a template to be used to generate the layout image and the arrangement order of the template based on the layout information sent by the information processing apparatus, and lays out the layout data included in the data set sent by the information processing apparatus in each slot of the specified template based on the file name, thereby generating the layout image.

13. The information processing apparatus according to claim 12, wherein the data set further includes at least one of layout information of the image in a slot and parameter information of image processing for the image, and the information processing apparatus assigns a file name corresponding to a name assigned to the corresponding layout data to each of the layout information and the parameter information.

14. The information processing apparatus according to claim 13, wherein the at least one processor of the information processing apparatus further causes the information processing apparatus, by executing the computer code, to perform image processing for the image data, and instead of sending the parameter information, the information processing apparatus sends, as the layout data, the image data that has undergone the image processing.

15. The information processing apparatus according to claim 14, wherein the image processing is one of trimming and resolution conversion.

16. The information processing apparatus according to claim 13, wherein, in the generated data set, the layout data and the layout information and parameter information corresponding to the layout data are assigned with file names so that parts other than an extension of the file names are common, and the name assigned to the layout data is determined based on a rule defined by the information processing apparatus.

17. The information processing apparatus according to claim 10, wherein the plurality of templates stored in the information processing apparatus is not obtained when laying out the plurality of images.

18. The information processing apparatus according to claim 10, wherein the information processing apparatus (i) further obtains information about compatibility between the plurality of templates, and (ii) can accept change to another template compatible with an template used when generating the data set based on the information about compatibility, and, if the information processing apparatus accepts the change to the another template after sending the generated layout information and the generated data set, the information processing apparatus sends information indicating identification number of the another template without re-sending the generated data set.

19. A method of controlling an information processing apparatus capable of communicating with an external apparatus, wherein an application stored in the information processing apparatus includes a plurality of templates and identification information assigned to each template, the method comprising:

acquiring a plurality of images;

laying out one of the acquired plurality of images in one slot of one of the plurality of templates stored in the information processing apparatus to generate a plurality of layout images, wherein the generated images are arranged in an arrangement order;

causing a display unit to display the generated layout images which are respectively arranged in slots of each of the plurality of templates;

generating layout information in which the pieces of identification information respectively assigned to the plurality of templates used in the layout images generated in the generating the plurality of layout images are described in the arrangement order;

generating a data set in which layout data includes the images used for generating the layout images and stored using the names with consecutive numbers, wherein the data set does not include any templates themselves; and sending the generated layout information in the generating the layout information and the generated data set in the generating the data set, wherein no templates themselves are sent with the generated layout information and the generated data set, wherein the generated layout information sent and the generated data set sent are used by the external apparatus, with a plurality of templates stored in the external apparatus, for generating a layout image.

* * * * *